(12) United States Patent
Tsang et al.

(10) Patent No.: US 11,620,677 B1
(45) Date of Patent: *Apr. 4, 2023

(54) MOBILE DEVICE SIGHTING LOCATION ANALYTICS AND PROFILING SYSTEM

(71) Applicant: Experian Information Solutions, Inc., Costa Mesa, CA (US)

(72) Inventors: Alan Tsang, San Diego, CA (US); Andrew John Hickman, Summit, NJ (US); Honghao Shan, San Diego, CA (US); Yaqi Tao, Palo Alto, CA (US); Gregor Bonin, San Diego, CA (US); Shanji Xiong, San Diego, CA (US); Lingyun Zhang, San Diego, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,838

(22) Filed: Jan. 12, 2022

Related U.S. Application Data

(63) Continuation of application No. 16/698,546, filed on Nov. 27, 2019, now Pat. No. 11,257,117, which is a
(Continued)

(51) Int. Cl.
*G06Q 30/02* (2012.01)
*G06Q 30/0251* (2023.01)
(Continued)

(52) U.S. Cl.
CPC ..... *G06Q 30/0259* (2013.01); *G06Q 30/0205* (2013.01); *H04W 4/02* (2013.01); *H04W 64/00* (2013.01)

(58) Field of Classification Search
None
See application file for complete search history.

(56) References Cited

U.S. PATENT DOCUMENTS

| 4,775,935 A | 10/1988 | Yourick |
| 4,982,346 A | 1/1991 | Girouard et al. |

(Continued)

FOREIGN PATENT DOCUMENTS

| CA | 2 865 348 | 3/2015 |
| CA | 2 942 328 | 4/2020 |

(Continued)

OTHER PUBLICATIONS

Philipp Greitsch, "Beginner's Guide to Location-Based Mobile Advertising", retrieved from https://trendblog.net/beginners-guide-location-based-mobile-advertising/, available on Mar. 8, 2013 (Year: 2013).*

(Continued)

*Primary Examiner* — Sam Refai
(74) *Attorney, Agent, or Firm* — Knobbe, Martens, Olson & Bear LLP

(57) ABSTRACT

The present disclosure describes systems and methods for providing enhanced location analysis and consumer insights using mobile sightings data. An approximate geographic location is useful to mobile service providers and advertisers who wish to provide targeted content to consumers based on their location. The location analysis described herein provides more depth and detail about the detected geographic location of the consumer and also insights into business locations visited by the user of the device, consumer/market segments and patterns of behavior (for an individual consumer and/or for aggregated group of consumers), retail trends and patterns, and other profile information. For example, a location profile analytics system as described herein can determine a probability that an approximate geographic location actually corresponds to a specific geographic location, such as a business location. The analysis performed by the location profile analytics system may be
(Continued)

further refined based on a number of additional input parameters.

14 Claims, 6 Drawing Sheets

Related U.S. Application Data continuation of application No. 14/748,675, filed on Jun. 24, 2015, now abandoned.

(60) Provisional application No. 62/016,989, filed on Jun. 25, 2014.

(51) Int. Cl.
*G06Q 30/0204* (2023.01)
*H04W 4/02* (2018.01)
*H04W 64/00* (2009.01)

(56) References Cited

U.S. PATENT DOCUMENTS

| | | |
|---|---|---|
| 5,201,010 A | 4/1993 | Deaton et al. |
| 5,274,547 A | 12/1993 | Zoffel et al. |
| 5,283,731 A | 2/1994 | Lalonde et al. |
| 5,305,195 A | 4/1994 | Murphy |
| 5,325,509 A | 6/1994 | Lautzenheiser |
| 5,347,632 A | 9/1994 | Filepp et al. |
| 5,454,030 A | 9/1995 | de Oliveira et al. |
| 5,459,306 A | 10/1995 | Stein et al. |
| 5,504,675 A | 4/1996 | Cragun et al. |
| 5,515,098 A | 5/1996 | Carles |
| 5,560,008 A | 9/1996 | Johnson et al. |
| 5,563,783 A | 10/1996 | Stolfo et al. |
| 5,583,380 A | 12/1996 | Larsen et al. |
| 5,592,560 A | 1/1997 | Deaton et al. |
| 5,627,973 A | 5/1997 | Armstrong et al. |
| 5,629,982 A | 5/1997 | Micali |
| 5,630,127 A | 5/1997 | Moore et al. |
| 5,649,114 A | 7/1997 | Deaton et al. |
| 5,661,516 A | 8/1997 | Carles |
| 5,689,565 A | 11/1997 | Spies et al. |
| 5,696,898 A | 12/1997 | Baker et al. |
| 5,696,907 A | 12/1997 | Tom |
| 5,717,923 A | 2/1998 | Dedrick |
| 5,724,521 A | 3/1998 | Dedrick |
| 5,740,549 A | 4/1998 | Reilly et al. |
| 5,745,654 A | 4/1998 | Titan |
| 5,745,694 A | 4/1998 | Egawa et al. |
| 5,774,357 A | 6/1998 | Hoffberg et al. |
| 5,774,868 A | 6/1998 | Cragun et al. |
| 5,774,870 A | 6/1998 | Storey |
| 5,809,481 A | 9/1998 | Baton et al. |
| 5,819,092 A | 10/1998 | Ferguson et al. |
| 5,819,226 A | 10/1998 | Gopinathan et al. |
| 5,823,879 A | 10/1998 | Goldberg et al. |
| 5,825,884 A | 10/1998 | Zdepski et al. |
| 5,828,837 A | 10/1998 | Eikland |
| 5,848,396 A | 12/1998 | Gerace |
| 5,857,175 A | 1/1999 | Day et al. |
| 5,864,822 A | 1/1999 | Baker, III |
| 5,870,721 A | 2/1999 | Norris |
| 5,873,068 A | 2/1999 | Beaumont et al. |
| 5,889,799 A | 3/1999 | Grossman et al. |
| 5,889,958 A | 3/1999 | Willens |
| 5,890,140 A | 3/1999 | Clark et al. |
| 5,907,608 A | 5/1999 | Shaffer et al. |
| 5,907,830 A | 5/1999 | Engel et al. |
| 5,912,839 A | 6/1999 | Ovshinsky et al. |
| 5,915,243 A | 6/1999 | Smolen |
| 5,918,014 A | 6/1999 | Robinson et al. |
| 5,924,082 A | 7/1999 | Silverman et al. |
| 5,930,764 A | 7/1999 | Melchione et al. |
| 5,930,776 A | 7/1999 | Dykstra et al. |
| 5,933,811 A | 8/1999 | Angles et al. |
| 5,933,813 A | 8/1999 | Teicher et al. |
| 5,944,790 A | 8/1999 | Levy |
| 5,948,061 A | 9/1999 | Merriman et al. |
| 5,953,707 A | 9/1999 | Huang et al. |
| 5,961,593 A | 10/1999 | Gabber et al. |
| 5,966,695 A | 10/1999 | Melchione et al. |
| 5,974,396 A | 10/1999 | Anderson et al. |
| 5,991,735 A | 11/1999 | Gerace |
| 6,014,688 A | 1/2000 | Venkatraman et al. |
| 6,026,368 A | 2/2000 | Brown et al. |
| 6,029,139 A | 2/2000 | Cunningham et al. |
| 6,044,357 A | 3/2000 | Garg |
| 6,055,573 A | 4/2000 | Gardenswartz et al. |
| 6,061,658 A | 5/2000 | Chou et al. |
| 6,061,691 A | 5/2000 | Fox |
| 6,064,973 A | 5/2000 | Smith et al. |
| 6,070,142 A | 5/2000 | McDonough et al. |
| 6,070,147 A | 5/2000 | Harms et al. |
| 6,073,241 A | 6/2000 | Rosenberg et al. |
| 6,078,892 A | 6/2000 | Anderson et al. |
| 6,085,169 A | 7/2000 | Walker et al. |
| 6,101,486 A | 8/2000 | Roberts et al. |
| 6,115,693 A | 9/2000 | McDonough et al. |
| 6,144,948 A | 11/2000 | Walker et al. |
| 6,178,442 B1 | 1/2001 | Yamazaki |
| 6,202,053 B1 | 3/2001 | Christiansen et al. |
| 6,205,432 B1 | 3/2001 | Gabbard et al. |
| 6,208,979 B1 | 3/2001 | Sinclair |
| 6,209,033 B1 | 3/2001 | Datta et al. |
| 6,233,566 B1 | 5/2001 | Levine et al. |
| 6,236,977 B1 | 5/2001 | Verba |
| 6,269,343 B1 | 7/2001 | Pallakoff |
| 6,289,318 B1 | 9/2001 | Barber |
| 6,298,330 B1 | 10/2001 | Gardenswartz et al. |
| 6,308,210 B1 | 10/2001 | Fields et al. |
| 6,317,752 B1 | 11/2001 | Lee et al. |
| 6,324,566 B1 | 11/2001 | Himmel et al. |
| 6,330,546 B1 | 12/2001 | Gopinathan et al. |
| 6,334,110 B1 | 12/2001 | Walter et al. |
| 6,385,592 B1 | 5/2002 | Angles et al. |
| 6,385,594 B1 | 5/2002 | Lebda et al. |
| 6,412,012 B1 | 6/2002 | Bieganski et al. |
| 6,424,956 B1 | 7/2002 | Werbos |
| 6,442,529 B1 | 8/2002 | Krishan et al. |
| 6,442,577 B1 | 8/2002 | Britton et al. |
| 6,445,975 B1 | 9/2002 | Ramsey |
| 6,460,036 B1 | 10/2002 | Herz |
| 6,477,509 B1 | 11/2002 | Hammons et al. |
| 6,487,538 B1 | 11/2002 | Gupta et al. |
| 6,505,168 B1 | 1/2003 | Rothman et al. |
| 6,513,018 B1 | 1/2003 | Culhane |
| 6,546,257 B1 * | 4/2003 | Stewart ............... H04W 4/029 |
| | | 340/991 |
| 6,549,944 B1 | 4/2003 | Weinberg et al. |
| 6,604,089 B1 | 8/2003 | Van Horn et al. |
| 6,606,744 B1 | 8/2003 | Mikurak |
| 6,611,816 B2 | 8/2003 | Lebda et al. |
| 6,615,247 B1 | 9/2003 | Murphy |
| 6,623,529 B1 | 9/2003 | Lakritz |
| 6,631,356 B1 | 10/2003 | Van Horn et al. |
| 6,633,850 B1 | 10/2003 | Gabbard et al. |
| 6,640,215 B1 | 10/2003 | Galperin et al. |
| 6,665,715 B1 | 12/2003 | Houri |
| 6,671,818 B1 | 12/2003 | Mikurak |
| 6,698,020 B1 | 2/2004 | Zigmond et al. |
| 6,748,426 B1 | 6/2004 | Shaffer et al. |
| 6,757,740 B1 | 6/2004 | Parekh et al. |
| 6,801,909 B2 | 10/2004 | Delgado et al. |
| 6,810,356 B1 | 10/2004 | Garcia-Franco et al. |
| 6,839,682 B1 | 1/2005 | Blume et al. |
| 6,847,934 B1 | 1/2005 | Lin et al. |
| 6,873,979 B2 | 3/2005 | Fishman et al. |
| 6,901,406 B2 | 5/2005 | Nabe et al. |
| 6,915,269 B1 | 7/2005 | Shapiro et al. |
| 6,925,441 B1 | 8/2005 | Jones, III et al. |
| 6,959,281 B1 | 10/2005 | Freeling et al. |
| 6,970,830 B1 | 11/2005 | Samra et al. |
| 6,983,478 B1 | 1/2006 | Grauch et al. |

(56) References Cited

U.S. PATENT DOCUMENTS

| | | |
|---|---|---|
| 6,993,493 B1 | 1/2006 | Galperin et al. |
| 7,003,792 B1 | 2/2006 | Yuen |
| 7,013,285 B1 | 3/2006 | Rebane |
| 7,023,980 B2 | 4/2006 | Lenard |
| 7,031,945 B1 | 4/2006 | Donner |
| 7,033,792 B2 | 4/2006 | Zhong et al. |
| 7,039,607 B2 | 5/2006 | Watarai et al. |
| 7,047,251 B2 | 5/2006 | Reed et al. |
| 7,050,989 B1 | 5/2006 | Hurt et al. |
| 7,054,828 B2 | 5/2006 | Heching et al. |
| 7,072,853 B2 | 7/2006 | Shkedi |
| 7,072,963 B2 | 7/2006 | Anderson et al. |
| 7,076,442 B2 | 7/2006 | Lin et al. |
| 7,080,027 B2 | 7/2006 | Luby et al. |
| 7,085,734 B2 | 8/2006 | Grant et al. |
| 7,117,172 B1 | 10/2006 | Black |
| 7,136,448 B1 | 11/2006 | Venkataperumal et al. |
| 7,150,030 B1 | 12/2006 | Eldering et al. |
| 7,152,018 B2 | 12/2006 | Wicks |
| 7,152,237 B2 | 12/2006 | Flickinger et al. |
| 7,155,508 B2 | 12/2006 | Sankuratripati et al. |
| 7,165,037 B2 | 1/2007 | Lazarus et al. |
| 7,185,353 B2 | 2/2007 | Schlack |
| 7,191,144 B2 | 3/2007 | White |
| 7,194,420 B2 | 3/2007 | Ikezawa et al. |
| 7,212,979 B1 | 5/2007 | Matz et al. |
| 7,240,059 B2 | 7/2007 | Bayliss et al. |
| 7,243,075 B1 | 7/2007 | Shaffer et al. |
| 7,249,048 B1 | 7/2007 | O'Flaherty |
| 7,275,083 B1 | 9/2007 | Seibel et al. |
| 7,296,734 B2 | 11/2007 | Pliha |
| 7,305,364 B2 | 12/2007 | Nabe et al. |
| 7,308,418 B2 | 12/2007 | Malek et al. |
| 7,310,617 B1 | 12/2007 | Cunningham |
| 7,313,538 B2 | 12/2007 | Wilmes et al. |
| 7,313,622 B2 | 12/2007 | Lee et al. |
| 7,314,166 B2 | 1/2008 | Anderson et al. |
| 7,328,169 B2 | 2/2008 | Temares et al. |
| 7,343,294 B1 | 3/2008 | Sandholm et al. |
| 7,346,540 B2 | 3/2008 | Lin et al. |
| 7,363,308 B2 | 4/2008 | Dillon et al. |
| 7,366,694 B2 | 4/2008 | Lazerson |
| 7,370,057 B2 | 5/2008 | Burdick et al. |
| 7,376,603 B1 | 5/2008 | Mayr et al. |
| 7,376,714 B1 | 5/2008 | Gerken |
| 7,386,786 B2 | 6/2008 | Davis et al. |
| 7,392,203 B2 | 6/2008 | Edison et al. |
| 7,424,439 B1 | 9/2008 | Fayyad et al. |
| 7,428,526 B2 | 9/2008 | Miller et al. |
| 7,444,302 B2 | 10/2008 | Hu et al. |
| 7,451,095 B1 | 11/2008 | Bradley et al. |
| 7,458,508 B1 | 12/2008 | Shao et al. |
| 7,467,106 B1 | 12/2008 | Levine et al. |
| 7,472,088 B2 | 12/2008 | Taylor et al. |
| 7,499,868 B2 | 3/2009 | Galperin et al. |
| 7,529,689 B2 | 5/2009 | Rowan |
| 7,546,266 B2 | 6/2009 | Beirne et al. |
| 7,546,619 B2 | 6/2009 | Anderson et al. |
| 7,556,192 B2 | 7/2009 | Wokaty, Jr. |
| 7,562,184 B2 | 7/2009 | Henmi et al. |
| 7,565,153 B2 | 7/2009 | Alcock et al. |
| 7,571,139 B1 | 8/2009 | Giordano et al. |
| 7,580,856 B1 | 8/2009 | Pliha |
| 7,584,126 B1 | 9/2009 | White |
| 7,590,589 B2 | 9/2009 | Hoffberg |
| 7,593,893 B1 | 9/2009 | Ladd et al. |
| 7,606,778 B2 | 10/2009 | Dewar |
| 7,610,257 B1 | 10/2009 | Abrahams |
| 7,617,136 B1 | 11/2009 | Lessing et al. |
| 7,617,160 B1 | 11/2009 | Grove et al. |
| 7,636,941 B2 | 12/2009 | Blinn et al. |
| 7,653,592 B1 | 1/2010 | Flaxman et al. |
| 7,668,840 B2 | 2/2010 | Bayliss et al. |
| 7,672,865 B2 | 3/2010 | Kumar et al. |
| 7,672,897 B2 | 3/2010 | Chung et al. |
| 7,685,021 B2 | 3/2010 | Kumar et al. |
| 7,686,214 B1 | 3/2010 | Shao et al. |
| 7,689,528 B2 | 3/2010 | Zheng |
| 7,698,236 B2 | 4/2010 | Cox et al. |
| 7,707,059 B2 | 4/2010 | Reed et al. |
| 7,711,635 B2 | 5/2010 | Steele et al. |
| 7,715,546 B2 | 5/2010 | Pagel et al. |
| 7,720,750 B2 | 5/2010 | Brody |
| 7,725,300 B2 | 5/2010 | Pinto et al. |
| 7,730,509 B2 | 6/2010 | Boulet et al. |
| 7,734,570 B2 | 6/2010 | Bachman et al. |
| 7,739,142 B2 | 6/2010 | Chand et al. |
| 7,742,982 B2 | 6/2010 | Chaudhuri et al. |
| 7,752,236 B2 | 7/2010 | Williams et al. |
| 7,783,515 B1 | 8/2010 | Kumar et al. |
| 7,783,534 B2 | 8/2010 | Armstrong et al. |
| 7,788,147 B2 | 8/2010 | Haggerty et al. |
| 7,788,358 B2 | 8/2010 | Martino |
| 7,792,702 B1 | 9/2010 | Katz et al. |
| 7,793,835 B1 | 9/2010 | Coggeshall et al. |
| 7,801,843 B2 | 9/2010 | Kumar et al. |
| 7,814,004 B2 | 10/2010 | Haggerty et al. |
| 7,835,940 B2 | 11/2010 | Kowalchuk |
| 7,853,630 B2 | 12/2010 | Martino et al. |
| 7,853,700 B2 | 12/2010 | Lee et al. |
| 7,877,320 B1 | 1/2011 | Downey |
| 7,904,524 B2 | 3/2011 | Wehner et al. |
| 7,925,549 B2 | 4/2011 | Looney et al. |
| 7,937,286 B2 | 5/2011 | Newman |
| 7,957,991 B2 | 6/2011 | Mikurak |
| 7,962,368 B2 | 6/2011 | Kumar et al. |
| 7,962,404 B1 | 6/2011 | Metzger, II et al. |
| 7,962,501 B1 | 6/2011 | Semprevivo et al. |
| RE42,663 E | 8/2011 | Lazarus et al. |
| 7,996,521 B2 | 8/2011 | Chamberlain et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,015,140 B2 | 9/2011 | Kumar et al. |
| 8,024,264 B2 | 9/2011 | Chaudhuri et al. |
| 8,027,871 B2 | 9/2011 | Willams et al. |
| 8,027,888 B2 | 9/2011 | Chandran et al. |
| 8,032,409 B1 | 10/2011 | Mikurak |
| 8,064,586 B2 | 11/2011 | Shaffer et al. |
| 8,078,453 B2 | 12/2011 | Shaw |
| 8,078,524 B2 | 12/2011 | Crawford et al. |
| 8,086,524 B1 | 12/2011 | Craig et al. |
| 8,104,671 B2 | 1/2012 | Besecker et al. |
| 8,126,426 B2 | 2/2012 | Fridman et al. |
| 8,126,805 B2 | 2/2012 | Sulkowski et al. |
| 8,127,982 B1 | 3/2012 | Casey et al. |
| 8,135,607 B2 | 3/2012 | Willams et al. |
| 8,145,754 B2 | 3/2012 | Chamberlain et al. |
| 8,161,104 B2 | 4/2012 | Tomkow |
| 8,190,470 B2 | 5/2012 | Srivastava et al. |
| 8,200,677 B2 | 6/2012 | Martino et al. |
| 8,234,498 B2 | 7/2012 | Britti et al. |
| 8,255,268 B2 | 8/2012 | Rane et al. |
| 8,271,313 B2 | 9/2012 | Williams et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,296,229 B1 | 10/2012 | Yellin et al. |
| 8,301,574 B2 | 10/2012 | Kilger et al. |
| 8,346,593 B2 | 1/2013 | Fanelli |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,412,593 B1 | 4/2013 | Song et al. |
| 8,417,559 B2 | 4/2013 | Joshi et al. |
| 8,423,634 B2 | 4/2013 | Drees et al. |
| 8,438,170 B2 | 5/2013 | Koran et al. |
| 8,458,062 B2 | 6/2013 | Dutt et al. |
| 8,468,198 B2 | 6/2013 | Tomkow |
| 8,489,619 B1 | 7/2013 | Martino et al. |
| 8,515,828 B1 | 8/2013 | Wolf et al. |
| 8,515,862 B2 | 8/2013 | Zhang et al. |

(56) References Cited

U.S. PATENT DOCUMENTS

| | | |
|---|---|---|
| 8,533,038 B2 | 9/2013 | Bergh et al. |
| 8,533,322 B2 | 9/2013 | Chamberlain et al. |
| 8,560,434 B2 | 10/2013 | Morris et al. |
| 8,560,666 B2 | 10/2013 | Low |
| 8,566,167 B2 | 10/2013 | Munjal |
| 8,571,919 B2 | 10/2013 | Rane et al. |
| 8,571,929 B2 | 10/2013 | Srivastava et al. |
| 8,606,626 B1 | 12/2013 | DeSoto et al. |
| 8,606,695 B1 | 12/2013 | Arora et al. |
| 8,620,740 B2 | 12/2013 | Bergh et al. |
| 8,626,563 B2 | 1/2014 | Williams et al. |
| 8,630,929 B2 | 1/2014 | Haggerty et al. |
| 8,639,920 B2 | 1/2014 | Stack et al. |
| 8,694,361 B2 | 4/2014 | Durvasula et al. |
| 8,732,004 B1 | 5/2014 | Ramos et al. |
| 8,738,515 B2 | 5/2014 | Chaudhuri et al. |
| 8,768,743 B2 | 7/2014 | Kumar et al. |
| 8,943,060 B2 | 1/2015 | Krishnan et al. |
| 8,966,649 B2 | 2/2015 | Stack et al. |
| 9,058,340 B1 | 6/2015 | Chamberlain et al. |
| 9,105,048 B2 | 8/2015 | Koran et al. |
| 9,152,727 B1 | 10/2015 | Balducci et al. |
| 9,213,646 B1 | 12/2015 | LaPanse et al. |
| 9,329,715 B2 | 5/2016 | Schwarz et al. |
| 9,471,928 B2 | 10/2016 | Fanelli et al. |
| 9,501,781 B2 | 11/2016 | Singh et al. |
| 9,547,870 B1 | 1/2017 | Bradford |
| 9,595,051 B2 | 3/2017 | Stack et al. |
| 9,704,192 B2 | 7/2017 | Ainsworth et al. |
| 9,767,309 B1 | 9/2017 | Patel et al. |
| 9,785,890 B2 | 10/2017 | Sowani et al. |
| 9,846,884 B2 | 12/2017 | Milana et al. |
| 10,019,593 B1 | 7/2018 | Patel et al. |
| 10,089,664 B2 | 10/2018 | Hamdi et al. |
| 10,169,775 B2 | 1/2019 | Koltnow et al. |
| 10,248,968 B2 | 4/2019 | Sivaramakrishnan et al. |
| 10,292,008 B2 | 5/2019 | Nack et al. |
| 10,304,075 B2 | 5/2019 | Walz et al. |
| 10,354,311 B2 | 7/2019 | Ainsworth, III et al. |
| 10,380,619 B2 | 8/2019 | Pontious |
| 10,380,654 B2 | 8/2019 | Hirtenstein et al. |
| 10,423,976 B2 | 9/2019 | Walz |
| 10,460,335 B2 | 10/2019 | West |
| 10,467,672 B2 | 11/2019 | Ainsworth, III et al. |
| 10,510,094 B2 | 12/2019 | Sivaramakrishnan et al. |
| 10,621,600 B2 | 4/2020 | Palan et al. |
| 10,657,229 B2 | 5/2020 | Zoldi et al. |
| 10,664,759 B2 | 5/2020 | Naik |
| 10,678,894 B2 | 6/2020 | Yin et al. |
| 10,685,133 B1 | 6/2020 | Patel et al. |
| 10,726,425 B2 | 7/2020 | Korra et al. |
| 10,810,605 B2 | 10/2020 | Fanelli et al. |
| 10,825,038 B2 | 11/2020 | Walz et al. |
| 10,885,544 B2 | 1/2021 | Chaouki et al. |
| 10,929,924 B2 | 2/2021 | Koltnow et al. |
| 10,956,940 B2 | 3/2021 | Rahman et al. |
| 11,026,042 B2 | 6/2021 | Nack et al. |
| 11,080,722 B2 | 8/2021 | Werner et al. |
| 11,087,339 B2 | 8/2021 | Sowani et al. |
| 11,164,206 B2 | 11/2021 | Andrick |
| 11,250,499 B2 | 2/2022 | Fahner |
| 11,257,117 B1 | 2/2022 | Tsang et al. |
| 2001/0014868 A1 | 8/2001 | Herz et al. |
| 2001/0039523 A1 | 11/2001 | Iwamoto |
| 2002/0004754 A1 | 1/2002 | Gardenswartz et al. |
| 2002/0023051 A1 | 2/2002 | Kunzle et al. |
| 2002/0029162 A1 | 3/2002 | Mascarenhas |
| 2002/0046099 A1 | 4/2002 | Frengut et al. |
| 2002/0046105 A1 | 4/2002 | Gardenswartz et al. |
| 2002/0049968 A1 | 4/2002 | Wilson et al. |
| 2002/0051020 A1 | 5/2002 | Ferrari et al. |
| 2002/0055906 A1 | 5/2002 | Katz et al. |
| 2002/0065716 A1 | 5/2002 | Kuschill |
| 2002/0069203 A1 | 6/2002 | Dar et al. |
| 2002/0077890 A1 | 6/2002 | LaPointe et al. |
| 2002/0077964 A1 | 6/2002 | Brody et al. |
| 2002/0082892 A1 | 6/2002 | Raffel et al. |
| 2002/0083043 A1 | 6/2002 | Hoshi et al. |
| 2002/0099641 A1 | 7/2002 | Mills et al. |
| 2002/0099824 A1 | 7/2002 | Bender et al. |
| 2002/0099936 A1 | 7/2002 | Kou et al. |
| 2002/0116253 A1 | 8/2002 | Coyne et al. |
| 2002/0120504 A1 | 8/2002 | Gould et al. |
| 2002/0123904 A1 | 9/2002 | Amengual et al. |
| 2002/0123928 A1 | 9/2002 | Eldering et al. |
| 2002/0128960 A1 | 9/2002 | Lambiotte et al. |
| 2002/0129368 A1 | 9/2002 | Schlack et al. |
| 2002/0133404 A1 | 9/2002 | Pedersen |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0147669 A1 | 10/2002 | Taylor et al. |
| 2002/0147695 A1 | 10/2002 | Khedkar et al. |
| 2002/0161664 A1 | 10/2002 | Shaya et al. |
| 2002/0169655 A1 | 11/2002 | Beyer et al. |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0041050 A1 | 2/2003 | Smith et al. |
| 2003/0046222 A1 | 3/2003 | Bard et al. |
| 2003/0060284 A1 | 3/2003 | Hamalainen et al. |
| 2003/0061233 A1 | 3/2003 | Manasse et al. |
| 2003/0065563 A1 | 4/2003 | Elliott et al. |
| 2003/0093311 A1 | 5/2003 | Knowlson |
| 2003/0110293 A1 | 6/2003 | Friedman et al. |
| 2003/0120591 A1 | 6/2003 | Birkhead et al. |
| 2003/0144950 A1 | 7/2003 | O'Brien et al. |
| 2003/0158776 A1 | 8/2003 | Landesmann |
| 2003/0163708 A1 | 8/2003 | Tang |
| 2003/0167222 A1 | 9/2003 | Mehrotra et al. |
| 2003/0200135 A1 | 10/2003 | Wright |
| 2003/0216965 A1 | 11/2003 | Libman |
| 2003/0229507 A1 | 12/2003 | Perge |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |
| 2004/0024848 A1 | 2/2004 | Smith |
| 2004/0039688 A1 | 2/2004 | Sulkowski et al. |
| 2004/0049729 A1 | 3/2004 | Penfield |
| 2004/0059626 A1 | 3/2004 | Smallwood |
| 2004/0062213 A1 | 4/2004 | Koss |
| 2004/0078809 A1 | 4/2004 | Drazin |
| 2004/0083215 A1 | 4/2004 | de Jong |
| 2004/0098625 A1 | 5/2004 | Lagadec et al. |
| 2004/0102197 A1 | 5/2004 | Dietz |
| 2004/0107125 A1 | 6/2004 | Guheen et al. |
| 2004/0122730 A1 | 6/2004 | Tucciarone et al. |
| 2004/0122735 A1 | 6/2004 | Meshkin |
| 2004/0128193 A1 | 7/2004 | Brice et al. |
| 2004/0128236 A1 | 7/2004 | Brown et al. |
| 2004/0138932 A1 | 7/2004 | Johnson et al. |
| 2004/0139025 A1 | 7/2004 | Coleman |
| 2004/0153509 A1 | 8/2004 | Alcorn et al. |
| 2004/0163101 A1 | 8/2004 | Swix |
| 2004/0176995 A1 | 9/2004 | Fusz |
| 2004/0193487 A1 | 9/2004 | Purcell et al. |
| 2004/0199456 A1 | 10/2004 | Flint et al. |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0230820 A1 | 11/2004 | Hui Hsu et al. |
| 2004/0261116 A1 | 12/2004 | Mckeown et al. |
| 2005/0010494 A1 | 1/2005 | Mourad et al. |
| 2005/0021397 A1 | 1/2005 | Cui et al. |
| 2005/0050027 A1 | 3/2005 | Yeh et al. |
| 2005/0065809 A1 | 3/2005 | Henze |
| 2005/0091077 A1 | 4/2005 | Reynolds |
| 2005/0097039 A1 | 5/2005 | Kulcsar et al. |
| 2005/0102375 A1 | 5/2005 | Varghese |
| 2005/0120045 A1 | 6/2005 | Klawon |
| 2005/0120249 A1 | 6/2005 | Shuster |
| 2005/0144067 A1 | 6/2005 | Farahat et al. |
| 2005/0144641 A1 | 6/2005 | Lewis |

(56) References Cited

U.S. PATENT DOCUMENTS

| | | |
|---|---|---|
| 2005/0177442 A1 | 8/2005 | Sullivan et al. |
| 2005/0177489 A1 | 8/2005 | Neff et al. |
| 2005/0192008 A1 | 9/2005 | Desai et al. |
| 2005/0201272 A1 | 9/2005 | Wang et al. |
| 2005/0204381 A1 | 9/2005 | Ludvig et al. |
| 2005/0209922 A1 | 9/2005 | Hofmeister |
| 2005/0222900 A1 | 10/2005 | Fuloria et al. |
| 2005/0222906 A1 | 10/2005 | Chen |
| 2005/0233742 A1 | 10/2005 | Karaoguz et al. |
| 2005/0234969 A1 | 10/2005 | Mamou et al. |
| 2005/0251820 A1 | 11/2005 | Stefanik et al. |
| 2005/0257250 A1 | 11/2005 | Mitchell et al. |
| 2005/0261959 A1 | 11/2005 | Moyer |
| 2005/0273849 A1 | 12/2005 | Araujo et al. |
| 2005/0278246 A1 | 12/2005 | Friedman et al. |
| 2005/0278743 A1 | 12/2005 | Flickinger et al. |
| 2005/0288954 A1 | 12/2005 | McCarthy et al. |
| 2006/0004626 A1 | 1/2006 | Holmen et al. |
| 2006/0004731 A1 | 1/2006 | Seibel et al. |
| 2006/0020611 A1 | 1/2006 | Gilbert et al. |
| 2006/0041443 A1 | 2/2006 | Horvath |
| 2006/0041500 A1 | 2/2006 | Diana et al. |
| 2006/0053047 A1 | 3/2006 | Garcia et al. |
| 2006/0059062 A1 | 3/2006 | Wood et al. |
| 2006/0059073 A1 | 3/2006 | Walzak |
| 2006/0080210 A1 | 4/2006 | Mourad et al. |
| 2006/0080233 A1 | 4/2006 | Mendelovich et al. |
| 2006/0080251 A1 | 4/2006 | Fried et al. |
| 2006/0080274 A1 | 4/2006 | Mourad |
| 2006/0089914 A1 | 4/2006 | Shiel et al. |
| 2006/0095363 A1 | 5/2006 | May |
| 2006/0100954 A1 | 5/2006 | Schoen |
| 2006/0122921 A1 | 6/2006 | Comerford et al. |
| 2006/0144927 A1 | 7/2006 | Love et al. |
| 2006/0155639 A1 | 7/2006 | Lynch et al. |
| 2006/0168068 A1 | 7/2006 | Ziegert |
| 2006/0173772 A1 | 8/2006 | Hayes et al. |
| 2006/0178189 A1 | 8/2006 | Walker et al. |
| 2006/0178971 A1 | 8/2006 | Owen et al. |
| 2006/0178983 A1 | 8/2006 | Nice et al. |
| 2006/0195866 A1 | 8/2006 | Thukral |
| 2006/0206379 A1 | 9/2006 | Rosenberg |
| 2006/0206416 A1 | 9/2006 | Farias |
| 2006/0212350 A1 | 9/2006 | Ellis et al. |
| 2006/0212353 A1 | 9/2006 | Roslov et al. |
| 2006/0218079 A1 | 9/2006 | Goldblatt et al. |
| 2006/0224696 A1 | 10/2006 | King et al. |
| 2006/0229943 A1 | 10/2006 | Mathias et al. |
| 2006/0229996 A1 | 10/2006 | Keithley et al. |
| 2006/0230415 A1 | 10/2006 | Roeding |
| 2006/0241923 A1 | 10/2006 | Xu et al. |
| 2006/0242046 A1 | 10/2006 | Haggerty et al. |
| 2006/0242050 A1 | 10/2006 | Haggerty et al. |
| 2006/0247991 A1 | 11/2006 | Jin et al. |
| 2006/0253323 A1 | 11/2006 | Phan et al. |
| 2006/0259364 A1 | 11/2006 | Strock et al. |
| 2006/0276171 A1 | 12/2006 | Pousti |
| 2006/0277102 A1 | 12/2006 | Agliozzo |
| 2006/0282327 A1 | 12/2006 | Neal et al. |
| 2006/0282328 A1 | 12/2006 | Gerace et al. |
| 2006/0282856 A1 | 12/2006 | Errico et al. |
| 2006/0287915 A1 | 12/2006 | Boulet et al. |
| 2006/0287919 A1 | 12/2006 | Rubens et al. |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0294199 A1 | 12/2006 | Bertholf |
| 2007/0011020 A1 | 1/2007 | Martin |
| 2007/0011039 A1 | 1/2007 | Oddo |
| 2007/0011099 A1 | 1/2007 | Sheehan |
| 2007/0016518 A1 | 1/2007 | Atkinson et al. |
| 2007/0022032 A1 | 1/2007 | Anderson et al. |
| 2007/0027791 A1 | 2/2007 | Young et al. |
| 2007/0033227 A1 | 2/2007 | Gaito et al. |
| 2007/0038516 A1 | 2/2007 | Apple et al. |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0078835 A1 | 4/2007 | Donnelli |
| 2007/0121843 A1 | 5/2007 | Atazky et al. |
| 2007/0129993 A1 | 6/2007 | Alvin |
| 2007/0156515 A1 | 7/2007 | Hasselback et al. |
| 2007/0156589 A1 | 7/2007 | Zimler et al. |
| 2007/0157110 A1 | 7/2007 | Gandhi et al. |
| 2007/0169189 A1 | 7/2007 | Crespo et al. |
| 2007/0174122 A1 | 7/2007 | Howard et al. |
| 2007/0175986 A1 | 8/2007 | Petrone et al. |
| 2007/0192165 A1 | 8/2007 | Haggerty et al. |
| 2007/0192409 A1 | 8/2007 | Kleinstern et al. |
| 2007/0208619 A1 | 9/2007 | Branam et al. |
| 2007/0220553 A1 | 9/2007 | Branam et al. |
| 2007/0220611 A1 | 9/2007 | Socolow et al. |
| 2007/0233857 A1 | 10/2007 | Cheng et al. |
| 2007/0244732 A1 | 10/2007 | Chatterji et al. |
| 2007/0271178 A1 | 11/2007 | Davis et al. |
| 2007/0271582 A1 | 11/2007 | Ellis et al. |
| 2007/0282684 A1 | 12/2007 | Prosser et al. |
| 2007/0288271 A1 | 12/2007 | Klinkhammer |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294163 A1 | 12/2007 | Harmon et al. |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010142 A1 | 1/2008 | O'Brien et al. |
| 2008/0010206 A1 | 1/2008 | Coleman |
| 2008/0021802 A1 | 1/2008 | Pendleton |
| 2008/0028067 A1 | 1/2008 | Berkhin et al. |
| 2008/0040216 A1 | 2/2008 | Dellovo |
| 2008/0059317 A1 | 3/2008 | Chandran et al. |
| 2008/0059352 A1 | 3/2008 | Chandran |
| 2008/0065774 A1 | 3/2008 | Keeler |
| 2008/0086368 A1 | 4/2008 | Bauman et al. |
| 2008/0091535 A1 | 4/2008 | Heiser et al. |
| 2008/0097928 A1 | 4/2008 | Paulson |
| 2008/0120155 A1 | 5/2008 | Pliha |
| 2008/0126476 A1 | 5/2008 | Nicholas et al. |
| 2008/0133325 A1 | 6/2008 | De et al. |
| 2008/0134042 A1 | 6/2008 | Jankovich |
| 2008/0140476 A1 | 6/2008 | Anand et al. |
| 2008/0147425 A1 | 6/2008 | Durvasula |
| 2008/0167956 A1 | 7/2008 | Keithley |
| 2008/0177836 A1 | 7/2008 | Bennett |
| 2008/0183564 A1 | 7/2008 | Tien et al. |
| 2008/0184289 A1 | 7/2008 | Cristofalo et al. |
| 2008/0208548 A1 | 8/2008 | Metzger et al. |
| 2008/0215470 A1 | 9/2008 | Sengupta et al. |
| 2008/0215607 A1 | 9/2008 | Kaushansky et al. |
| 2008/0222127 A1 | 9/2008 | Bergin |
| 2008/0228578 A1 | 9/2008 | Mashinsky |
| 2008/0228635 A1 | 9/2008 | Megdal et al. |
| 2008/0255897 A1 | 10/2008 | Megdal et al. |
| 2008/0256061 A1 | 10/2008 | Chang et al. |
| 2008/0294540 A1 | 11/2008 | Celka et al. |
| 2008/0294546 A1 | 11/2008 | Flannery |
| 2008/0301727 A1 | 12/2008 | Cristofalo et al. |
| 2009/0006475 A1 | 1/2009 | Udezue et al. |
| 2009/0018996 A1 | 1/2009 | Hunt et al. |
| 2009/0019027 A1 | 1/2009 | Ju et al. |
| 2009/0024462 A1 | 1/2009 | Lin |
| 2009/0044246 A1 | 2/2009 | Sheehan et al. |
| 2009/0064326 A1 | 3/2009 | Goldstein |
| 2009/0076883 A1 | 3/2009 | Kilger et al. |
| 2009/0089205 A1 | 4/2009 | Bayne |
| 2009/0094640 A1 | 4/2009 | Anderson et al. |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0132347 A1 | 5/2009 | Anderson et al. |
| 2009/0132559 A1 | 5/2009 | Chamberlain et al. |
| 2009/0132691 A1 | 5/2009 | Daurensan et al. |
| 2009/0133058 A1 | 5/2009 | Kouritzin et al. |

(56) References Cited

U.S. PATENT DOCUMENTS

| | | |
|---|---|---|
| 2009/0144102 A1 | 6/2009 | Lopez |
| 2009/0144201 A1 | 6/2009 | Gierkink et al. |
| 2009/0164293 A1 | 6/2009 | Coley |
| 2009/0171755 A1 | 7/2009 | Kane et al. |
| 2009/0172035 A1 | 7/2009 | Lessing et al. |
| 2009/0177480 A1 | 7/2009 | Chen et al. |
| 2009/0215479 A1 | 8/2009 | Karmarkar |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234708 A1 | 9/2009 | Heiser, II et al. |
| 2009/0234715 A1 | 9/2009 | Heiser, II et al. |
| 2009/0249440 A1 | 10/2009 | Platt et al. |
| 2009/0265326 A1 | 10/2009 | Lehrman et al. |
| 2009/0288109 A1 | 11/2009 | Downey et al. |
| 2009/0313163 A1 | 12/2009 | Wang et al. |
| 2009/0319648 A1 | 12/2009 | Dutta et al. |
| 2010/0010935 A1 | 1/2010 | Shelton |
| 2010/0017300 A1 | 1/2010 | Bramlage et al. |
| 2010/0030649 A1 | 2/2010 | Ubelhor |
| 2010/0037255 A1 | 2/2010 | Sheehan et al. |
| 2010/0094704 A1 | 4/2010 | Subramanian et al. |
| 2010/0094758 A1 | 4/2010 | Chamberlain et al. |
| 2010/0106568 A1 | 4/2010 | Grimes |
| 2010/0114663 A1 | 5/2010 | Casas et al. |
| 2010/0138290 A1 | 6/2010 | Zschocke et al. |
| 2010/0145791 A1 | 6/2010 | Canning et al. |
| 2010/0161492 A1 | 6/2010 | Harvey et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0191598 A1 | 7/2010 | Toennis et al. |
| 2010/0211445 A1 | 8/2010 | Bodington |
| 2010/0268660 A1 | 10/2010 | Ekdahl |
| 2011/0023115 A1 | 1/2011 | Wright |
| 2011/0029388 A1 | 2/2011 | Kendall et al. |
| 2011/0047072 A1 | 2/2011 | Ciurea |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078018 A1 | 3/2011 | Chunilal |
| 2011/0078073 A1 | 3/2011 | Annappindi et al. |
| 2011/0093327 A1 | 4/2011 | Fordyce, III et al. |
| 2011/0125595 A1 | 5/2011 | Neal et al. |
| 2011/0137789 A1 | 6/2011 | Kortina et al. |
| 2011/0164746 A1 | 7/2011 | Nice et al. |
| 2011/0178843 A1 | 7/2011 | Rane et al. |
| 2011/0178844 A1 | 7/2011 | Rane et al. |
| 2011/0178845 A1 | 7/2011 | Rane et al. |
| 2011/0178846 A1 | 7/2011 | Rane et al. |
| 2011/0178847 A1 | 7/2011 | Rane et al. |
| 2011/0178848 A1 | 7/2011 | Rane et al. |
| 2011/0178855 A1 | 7/2011 | Rane et al. |
| 2011/0178899 A1 | 7/2011 | Huszar |
| 2011/0202407 A1 | 8/2011 | Buhrmann et al. |
| 2011/0208578 A1 | 8/2011 | Bergh et al. |
| 2011/0211445 A1 | 9/2011 | Chen |
| 2011/0212717 A1 | 9/2011 | Rhoads et al. |
| 2011/0213641 A1 | 9/2011 | Metzger, II et al. |
| 2011/0219421 A1 | 9/2011 | Ullman et al. |
| 2011/0258050 A1 | 10/2011 | Chan et al. |
| 2011/0264581 A1 | 10/2011 | Clyne |
| 2011/0270618 A1 | 11/2011 | Banerjee et al. |
| 2011/0270661 A1 | 11/2011 | Heiser, II et al. |
| 2011/0276396 A1 | 11/2011 | Rathod |
| 2011/0282739 A1 | 11/2011 | Mashinsky et al. |
| 2011/0307397 A1 | 12/2011 | Benmbarek |
| 2012/0011056 A1 | 1/2012 | Ward et al. |
| 2012/0011068 A1 | 1/2012 | Dearing et al. |
| 2012/0011158 A1 | 1/2012 | Avner et al. |
| 2012/0016733 A1 | 1/2012 | Belvin et al. |
| 2012/0016948 A1 | 1/2012 | Sinha |
| 2012/0047219 A1 | 2/2012 | Feng et al. |
| 2012/0054592 A1 | 3/2012 | Jaffe et al. |
| 2012/0060207 A1 | 3/2012 | Mardikar et al. |
| 2012/0066065 A1 | 3/2012 | Switzer |
| 2012/0101892 A1 | 4/2012 | LeFebvre |
| 2012/0110677 A1 | 5/2012 | Abendroth et al. |
| 2012/0143921 A1 | 6/2012 | Wilson |
| 2012/0179536 A1 | 7/2012 | Kalb et al. |
| 2012/0203639 A1 | 8/2012 | Webster et al. |
| 2012/0209586 A1 | 8/2012 | Mieritz et al. |
| 2012/0239497 A1 | 9/2012 | Nuzzi |
| 2012/0239515 A1 | 9/2012 | Batra et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0117832 A1 | 5/2013 | Gandhi |
| 2013/0132151 A1 | 5/2013 | Stibel et al. |
| 2013/0173481 A1 | 7/2013 | Hirtenstein et al. |
| 2013/0218638 A1 | 8/2013 | Kilger et al. |
| 2013/0226857 A1* | 8/2013 | Shim ............... H04W 4/021 706/52 |
| 2013/0252638 A1* | 9/2013 | Yang ............... H04W 4/029 455/456.3 |
| 2013/0262226 A1 | 10/2013 | LaChapelle et al. |
| 2013/0293363 A1 | 11/2013 | Plymouth |
| 2013/0332230 A1 | 12/2013 | Fanelli et al. |
| 2013/0339087 A1 | 12/2013 | Fanelli et al. |
| 2013/0339143 A1 | 12/2013 | Drozd et al. |
| 2014/0025489 A1 | 1/2014 | Srivastava et al. |
| 2014/0025815 A1 | 1/2014 | Low |
| 2014/0032265 A1 | 1/2014 | Paprocki et al. |
| 2014/0046887 A1 | 2/2014 | Lessin |
| 2014/0058818 A1 | 2/2014 | Drozd et al. |
| 2014/0096249 A1 | 4/2014 | Dupont et al. |
| 2014/0164112 A1 | 6/2014 | Kala |
| 2014/0164398 A1 | 6/2014 | Smith et al. |
| 2014/0172576 A1 | 6/2014 | Spears et al. |
| 2014/0188555 A1 | 7/2014 | Durvasula |
| 2014/0214482 A1 | 7/2014 | Williams et al. |
| 2014/0222908 A1 | 8/2014 | Park et al. |
| 2014/0236706 A1 | 8/2014 | Opie et al. |
| 2014/0278507 A1 | 9/2014 | Potter |
| 2014/0279420 A1 | 9/2014 | Okerlund et al. |
| 2014/0310098 A1 | 10/2014 | Epperson |
| 2014/0330670 A1 | 11/2014 | Ainsworth, III et al. |
| 2015/0019394 A1* | 1/2015 | Unser ............... G06Q 20/3224 705/35 |
| 2015/0058957 A1 | 2/2015 | Halliday et al. |
| 2015/0095104 A1 | 4/2015 | Goldberg |
| 2015/0106270 A1 | 4/2015 | Burrell et al. |
| 2015/0128240 A1 | 5/2015 | Richards et al. |
| 2015/0128287 A1 | 5/2015 | LaFever |
| 2015/0193821 A1 | 7/2015 | Izumori et al. |
| 2015/0248691 A1 | 9/2015 | Pontious |
| 2015/0262246 A1 | 9/2015 | Stack et al. |
| 2015/0262248 A1 | 9/2015 | Chaouki et al. |
| 2015/0278225 A1 | 10/2015 | Weiss et al. |
| 2015/0295906 A1 | 10/2015 | Ufford et al. |
| 2015/0332391 A1 | 11/2015 | Srivastava et al. |
| 2015/0348200 A1 | 12/2015 | Fair et al. |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0162913 A1* | 6/2016 | Linden ............... G06Q 30/0202 705/7.31 |
| 2016/0189192 A1 | 6/2016 | Walz |
| 2016/0267508 A1 | 9/2016 | West |
| 2016/0371740 A1 | 12/2016 | Heiser, II et al. |
| 2017/0032393 A1 | 2/2017 | Fanelli et al. |
| 2017/0186297 A1 | 6/2017 | Brenner |
| 2017/0193315 A1 | 7/2017 | El-Khamy et al. |
| 2018/0060954 A1 | 3/2018 | Yin |
| 2018/0068323 A1 | 3/2018 | Stratton et al. |
| 2018/0121940 A1 | 5/2018 | Fanelli et al. |
| 2019/0087848 A1 | 3/2019 | Koltnow et al. |
| 2019/0147519 A1 | 5/2019 | Ainsworth, III et al. |
| 2019/0164184 A1 | 5/2019 | Walz |
| 2019/0180327 A1 | 6/2019 | Balagopalan et al. |
| 2019/0230464 A1 | 7/2019 | Nack et al. |
| 2019/0244237 A1 | 8/2019 | Magnuson, Jr. et al. |
| 2020/0043103 A1 | 2/2020 | Sheptunov |
| 2020/0126040 A1 | 4/2020 | Chilaka et al. |

(56) References Cited

U.S. PATENT DOCUMENTS

| | | | |
|---|---|---|---|
| 2020/0286168 | A1 | 9/2020 | Anderson et al. |
| 2020/0294127 | A1 | 9/2020 | Anderson et al. |
| 2020/0334695 | A1 | 10/2020 | Schmidt |
| 2020/0334702 | A1 | 10/2020 | Butvin et al. |
| 2020/0349240 | A1 | 11/2020 | Yin et al. |
| 2021/0019742 | A1 | 1/2021 | Pontious et al. |
| 2021/0065161 | A1 | 3/2021 | Hoar |
| 2021/0142372 | A1 | 5/2021 | Sadhwani et al. |
| 2021/0406948 | A1 | 12/2021 | Chaouki et al. |
| 2022/0027934 | A1 | 1/2022 | Andrick |

FOREIGN PATENT DOCUMENTS

| | | |
|---|---|---|
| CN | 1290372 | 5/2001 |
| CN | 114004655 | 2/2022 |
| DE | 91 08 341 | 10/1991 |
| EP | 0 554 083 | 8/1993 |
| EP | 0 749 081 | 12/1996 |
| EP | 1 028 401 | 8/2000 |
| EP | 1 122 664 | 8/2001 |
| JP | 10-293732 | 11/1998 |
| JP | 11-068828 | 3/1999 |
| JP | 2009-122880 | 6/2009 |
| KR | 10-2013-0107394 | 10/2013 |
| TW | I256569 | 6/2006 |
| WO | WO 91/003789 | 3/1991 |
| WO | WO 94/006103 | 3/1994 |
| WO | WO 95/016971 | 6/1995 |
| WO | WO 96/042041 | 12/1996 |
| WO | WO 97/023838 | 7/1997 |
| WO | WO 98/041913 | 9/1998 |
| WO | WO 98/049643 | 11/1998 |
| WO | WO 98/057285 | 12/1998 |
| WO | WO 99/004350 | 1/1999 |
| WO | WO 99/022328 | 5/1999 |
| WO | WO 99/032985 | 7/1999 |
| WO | WO 99/033012 | 7/1999 |
| WO | WO 99/037066 | 7/1999 |
| WO | WO 99/059375 | 11/1999 |
| WO | WO 99/067731 | 12/1999 |
| WO | WO 00/055789 | 9/2000 |
| WO | WO 00/055790 | 9/2000 |
| WO | WO 00/068862 | 11/2000 |
| WO | WO 01/010090 | 2/2001 |
| WO | WO 01/011522 | 2/2001 |
| WO | WO 01/075754 | 10/2001 |
| WO | WO 02/013025 | 2/2002 |
| WO | WO 03/101123 | 12/2003 |
| WO | WO 2006/110873 | 10/2006 |
| WO | WO 2007/149941 | 12/2007 |
| WO | WO 2008/022289 | 2/2008 |
| WO | WO 2008/057853 | 5/2008 |
| WO | WO 2008/076343 | 6/2008 |
| WO | WO 2008/127288 | 10/2008 |
| WO | WO 2009/132114 | 10/2009 |
| WO | WO 2010/045160 | 4/2010 |
| WO | WO 2010/062537 | 6/2010 |
| WO | WO 2010/093678 | 8/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO 2018/039377 | 3/2018 |
| ZA | 2009/03243 | 3/2010 |

OTHER PUBLICATIONS

U.S. Appl. No. 14/748,675, N/A, Mobile Device Sighting Location Analytics and Profiling System, filed Jun. 24, 2015.
U.S. Appl. No. 16/698,546, U.S. Pat. No. 11,257,117, Mobile Device Sighting Location Analytics and Profiling System, filed Nov. 27, 2019.
U.S. Appl. No. 12/705,489, Feb. 12, 2010, Bargoli et al.
U.S. Appl. No. 12/705,511, Feb. 12, 2010, Bargoli et al.

"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.
"Aggregate and Analyze Social Media Content: Gain Faster and Broader Insight to Market Sentiment," SAP Partner, Mantis Technology Group, Apr. 2011, pp. 4.
Akl, Selim G., "Digital Signatures: a Tutorial Survey," Computer, Feb. 1983, pp. 15-24.
"Atlas on Demand, Concurrent, and Everstream Strike Video-On-Demand Advertising Alliance", www.atlassolutions.com, Jul. 13, 2006, 3 pages.
"Arbitron 2006 Black Consumers," Arbitron Inc., lvtsg.com, Jul. 8, 2006, 2 pages, http://www.lvtsg.com/news/publish/Factoids/article_3648.shtml.
"Atlas on Demand and C-COR Join Forces to Offer Advertising Management Solution for on Demand TV: Global Provider of on Demand Systems Partners with Atlas to Develop and Market Comprehensive VOD Advertising Solution," www.atlassolutions.com, Jul. 25, 2005, 3 pages.
"Atlas on Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.
Adzilla, Press Release, "Zillacasting Technology Approved and Patent Pending," http://www.adzilla.com/newsroom/pdf/patent_051605.pdf, May 16, 2005, pp. 2.
AFX New Limited—AFX International Focus, "Nielsen moving to measure off-TV viewing," Jun. 14, 2006, 1 page.
Amo, Tina, "How to Find Out Who Has Lived in Your House Before You", https://web.archive.org/web/20130327090532/http://homeguides.sfgate.com/out-lived-house-before-50576.html as archived Mar. 27, 2013, pp. 2.
Applied Geographic Solutions, "What is MOSAIC™", as captured Feb. 15, 2004 from http://web.archive.org/web/20040215224329/http://www.appliedgeographic.com/mosaic.html in 2 pages.
Axiom, "Capabilites", http://www.axiomcom.com/capabilities/, printed May 7, 2015 in 2 pages.
Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
Bagozzi et al., "On the Evaluation of Structural Equation Models", JAMS, 1988, pp. 74-94.
"Bank of America Direct Web-Based Network Adds Core Functionality to Meet Day-To-Day Treasury Needs", Business Wire, Oct. 25, 1999. pp. 2.
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
Bitran et al., "Mailing Decisions in Catalog Sales Industry", Management Science (JSTOR), vol. 42, No. 9, pp. 1364-1381, Sep. 1996.
Blackbaud.com, www.blackbaud.com, various pages, retrieved Jan. 22, 2009 from www.archive.org, 23 pages.
Brown et al., "ALCOD IDSS: Assisting the Australian Stock Market Surveillance Team's Review Process," Applied Artificial Intelligence Journal, Dec. 1, 1996, pp. 625-641.
Bult et al., "Optimal Selection for Direct Mail," Marketing Science, Nov. 1995, vol. 14, No. 4, pp. 378-394.
Burr Ph.D., et al., "Utility Payments as Alternative Credit Data: a Reality Check", Asset Builders of America, Inc., Oct. 5, 2006, pp. 1-18, Washington, D.C.
"Cable Solution Now, the Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.

(56) References Cited

OTHER PUBLICATIONS

Caliendo, et al., "Some Practical Guidance for the Implementation of Propensity Score Matching", IZA:Discussion Paper Series, No. 1588, Germany, May 2005, pp. 32.

Card Marketing, Use the Latest CRM Tools and Techniques, www.CardForum.com, vol. 5 No. 10, Dec. 2001.

"Case Study: Expanding to Non-Traditional Prescreen Marketing Channels Reduces Company's Cost Per Account Booked", Fairlsaac, https://web.archive.org/web/20060428115326/http://www.fairisaac.com/NR/rdonlyres/048FAE87-14B5-4732-970D-BDF20F09EB2D/0/MSDSRealTimeCS.pdf, Apr. 2003, pp. 2.

ChannelWave.com, PRM Central—About PRM, http://web.archive.org/web/20000510214859/http://www.channelwave.com as printed on Jun. 21, 2006, May 2000 Archive.

"Chase Gets Positive," Bank Technology News, May 6, 2000, vol. 14, No. 5, p. 33.

Chung, Charles; Internet Retailer, "Multi-channel retailing requires the cleanest data—but don't expect it from the customer", Jan./Feb. 2002.

"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.

"Claritas Introduces PRIZM NE Consumer Electronic Monitor Profiles: New Information Product Provides Insight Into the Public's Purchasing Behaviors of Consumer Electronics," May 30, 2006, 3 pages.

"Cole Taylor Bank Chooses Integrated E-Banking/E-Payments/Reconciliation Solution From Fundtech", Business Wire, Oct. 21, 1999, pp. 2.

Click Z, "ISPs Collect User Data for Behavioral Ad Targeting," dated Jan. 3, 2008, printed from http://www.clickz.com/showPage.html?page=clickz Apr. 16, 2008.

Cnet news.com, "Target me with your ads, please," dated Dec. 5, 2007, printed from http://www.news.com/2102-1024_3-6221241.html?tag+st.util.print Mar. 18, 2008.

Creamer, Matthew; Consulting in marketing; Accenture, Others Playing Role in Firms' Processes, Crain's Chicago Business, Jun. 12, 2006, 2 pages.

Culhane, Patrick, "Data: Powerfully Linking Service and Profitability," Jul./Aug. 1996, Bank Management, vol. 72, No. 4, pp. 8-12.

CuneXus, "CuneXus Unveils Click-to-Accept Mobile Lending Platform at Finovate (VIDEO)", https://cunexusonline.com/cunexus-finovatespring-video-released/, May 2, 2014, pp. 2.

"Database Marketing: A new Approach to the Old Relationships," Chain Storage Executive Edition, Dialogue, Sep. 1991, pp. 2.

Davies, Donald W., "Applying the RSA Digital Signature to Electronic Mail," Computer, Feb. 1983, pp. 55-62.

Davis et al., "User Acceptance of Computer Technology: A Comparison of Two Theoretical Models", Management Science, Aug. 1989, vol. 35, No. 8, pp. 982-1003.

deGruchy, et al., "Geodemographic Profiling Benefits Stop-Smoking Service;" The British Journal of Healthcare Computing & Information Management; Feb. 2007; 24, 7; pp. 29-31.

Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.

Demographicsnow.com, sample reports, "Age Rank Report", Jul. 17, 2006, 3 pages.

Demographicsnow.com, sample reports, "Consumer Expenditure Summary Report", Jul. 17, 2006, 3 pages.

Demographicsnow.com, sample reports, "Income Comparison Report", Jul. 17, 2006, 4 pages.

Dolnicar, Sara, "Using Cluster Analysis for Market Segmentation—Typical Misconceptions, Established Methodological Weaknesses and Some Recommendations for Improvement," Australasian Journal of Market Research, 2003, vol. 11, No. 2, pp. 5-12.

Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.

Drawbridge, "Customer Success", http://www.drawbrid.ge/customer-success, printed May 7, 2015 in 17 pages.

Drawbridge, "Solutions", http://www.drawbrid.ge/solutions, printed May 7, 2015 in 5 pages.

Drawbridge, "Technology", http://www.drawbrid.ge/technology, printed May 7, 2015 in 3 pages.

Dstillery, "Products", http://dstillery.com/how-we-do-it/products/, printed May 7, 2015 in 2 pages.

Dstillery, "What We Do", http://dstillery.com/what-we-do/, printed May 7, 2015 in 2 pages.

Dstillery, "Who We Are", http://dstillery.com/who-we-are/, printed May 7, 2015 in 2 pages.

Dymi, Amilda, Need for Leads Spurs Some Upgrades, Origination News-Special Report, May 1, 2008, vol. 17, Issue No. 8, pp. 24, Atlanta, Copyright 2008 SourceMedia, Inc.

Egol, Len; "What's New in Database Marketing Software," Direct, Aug. 1994, vol. 6, No. 8, pp. 39.

"Epsilon Leads Discussion on Paradigm Shift in TV Advertising," epsilon.com, Jun. 24, 2004, 2 pages, http://www.epsilon.com/who-pr_tvad040624.html.

Experian and AGS Select SRC to Deliver Complete Marketing Solutions; Partnership First to Marketplace with Census2000 Data. PR Newswire. New York: Mar. 21, 2001. p. 1.

"Experian Launches Portfolio Monitor—Owner NoticesSM", News Release, Feb. 2003, Costa Mesa, CA.

Fanelli, Marc, "Building a Holistic Customer View", MultiChannel Merchant, Jun. 26, 2006, pp. 2.

Findermind, "PeopleFinders Review", as archived Jun. 1, 2012 in 4 pages. http://web.archive.org/web/20120601010134/http://www.findermind.com/tag/peoplefinders-review/.

Frontporch, "Ad Networks-Partner with Front Porch!," www.frontporch.com printed Apr. 2008 in 2 pages.

Frontporch, "New Free Revenue for Broadband ISPs!", http://www.frontporch.com/html/bt/FPBroadbandISPs.pdf printed May 28, 2008 in 2 pages.

"FTC Testifies: Identity Theft on the Rise", FTC News Release, Mar. 7, 2000, pp. 3.

Georges, et al., "KDD'99 Competition: Knowledge Discovery Contest", SAS Institute, 1999, 6 pages.

Gilje, Shelby, "Keeping Tabs on Businesses That Keep Tabs on Us", NewsRoom, The Seattle Times. Section: SCENE, Apr. 19, 1995, pp. 4.

Gonul, et al., "Optimal Mailing of Catalogs: A New Methodology Using Estimable Structural Dynamic Programming Models", 14 pages, Management Science, vol. 44, No. 9, Sep. 1998.

Greitsch, Philipp, "Beginner's Guide to Location-Based Mobile Advertising", https://trendblog.net/beginners-guide-location-based-mobile-advertising/, Mar. 8, 2013, pp. 4.

Halliday, Jean, "Ford Recruits Accenture for Marketing Plan," Automotive News Feb. 13, 2006, 2 pages, Crain Communications.

Hartfeil, Guenther, "Bank One Measures Profitability of Customers, Not Just Products," Journal of Retail Banking Services, Aug. 1996, vol. 18, No. 2, pp. 23-29.

Haughton et al., "Direct Marketing Modeling with CART and CHAID", Journal of Direct Marketing, Fall 1997, vol. 11, No. 4, pp. 42-52.

Helm, Burt, "Nielsen's New Ratings Yardstick," businessweek.com, Jun. 20, 2006, 3 pages, http://www.businessweek.com/technology/content/jun2006/tc20060620_054223.htm.

Hill, Kerry, "Identity Theft Your Social Security Number Provides Avenue for Thieves", NewsRoom, Wisconsin State Journal, Sep. 13, 1998, pp. 4.

Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.

Information Resources, Inc. and Navic Networks Form Joint Relationship to Support Next Generation of Technology for Advertising Testing, IRI Expands BehaviorScan® Solution to Meet Digital and

(56) References Cited

OTHER PUBLICATIONS

On-demand Needs, Feb. 27, 2006, http://us.infores.com/page/news/pr/pr_archive?mode-single&pr_id=117, printed Oct. 4, 2007 in 2 pages.

"Intelligent Miner Applications Guide", IBM Corp., Apr. 2, 1999, Chapters 4-7, pp. 33-132.

"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.

Jost, Allen; Neural Networks, Credit World, Mar./Apr. 1993, vol. 81, No. 4, pp. 26-33.

Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarlanZinman.pdf.

Lamons, Bob, "Be Smart: Offer Inquiry Qualification Services," Marketing News, ABI/Inform Global, Nov. 6, 1995, vol. 29, No. 23, pp. 13.

LeadVerifier: Why Should You Use LeadVerifier?, downloaded from www.leadverifier.com/LeadVerifier_Why.asp, dated Feb. 7, 2006 on www.archive.org.

Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.

LifeLock, http://web.archive.org/web/20110724011010/http://www.lifelock.com/? as archived Jul. 24, 2011 in 1 page.

Littwin, Angela, "Beyond Usury: A Study of Credit-Card Use and Preference Among Low-Income Consumers", Texas Law Review, vol. 86, No. 3, pp. 451-506; Feb. 2008.

Longo, Tracey, "Managing Money: Your Family Finances", Kiplinger's Personal Finance Magazine, Jun. 1, 1995, vol. 49, No. 6, pp. 4.

Loshin, Intelligent Enterprise: Better Insight for Business Decisions, "Value-Added Data: Merge Ahead", Feb. 9, 2000, vol. 3, No. 3, 5 pages.

McManus et al.; "Street Wiser," American Demographics; ABI/Inform Global; Jul./Aug. 2003; 25, 6; pp. 32-35.

McNamara, Paul, "Start-up's pitch: The Envelope, please," Network World, Apr. 28, 1997, vol. 14, No. 17, p. 33.

"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.

Morrissey, Brian, "Aim High: Ad Targeting Moves to the Next Level", Adweek, dated Jan. 21, 2008 as downloaded from http://www.adweek.com/aw/magazine/article_display.isp?vnu on Apr. 16, 2008.

Muus, et al., "A Decision Theoretic Framework for Profit Maximization in Direct Marketing", Sep. 1996, pp. 20.

NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.

"New Privista Product Provides Early Warning System to Combat Identity Theft", PR Newswire, Oct. 24, 2000, PR Newswire Association, Inc., New York.

Otter, et al., "Direct Mail Selection by Joint Modeling of the Probability and Quantity of Response", Jun. 1997, pp. 14.

Polatoglu et al., "Theory and Methodology, Probability Distributions of Cost, Revenue and Profit over a Warranty Cycle", European Journal of Operational Research, Jul. 1998, vol. 108, Issue 1, pp. 170-83.

"PostX to Present at Internet Showcase", PR Newswire, Apr. 28, 1997, pp. 2.

PostX, "PostX® Envelope and ActiveView", http://web.archive.org/web/19970714203719/http://www.postx.com/priducts_fm.html, Jul. 14, 1997 (retrieved Nov. 7, 2013) in 2 pages.

PR Web: Press Release Newswire, Anchor Launches LeadVerifier to Verify, Correct and Enhance Internet Leads, Jul. 19, 2005, pp. 2 pages, Farmingdale, NY.

Predictive Behavioral Targeting http://www.predictive-behavioral-targeting.com/index.php.Main_Page as printed Mar. 28, 2008 in 4 pages.

PrivacyGuard, http://web.archive.org/web/20110728114049/http://www.privacyguard.com/ as archived Jul. 28, 2011 in 1 page.

Punj et al., "Cluster Analysis in Marketing Research: Review and Suggestions for Application," Journal of Marketing Research, May 1983, vol. 20, No. 2, pp. 134-148.

Reinbach, Andrew, "MCIF Aids Banks in CRA Compliance", Bank Systems & Technology, Aug. 1995, vol. 32, No. 8, p. 27.

Rossi et al.; "The Value of Purchasing History Data in Target Marketing"; Marketing Science, Apr. 1996, vol. 15, No. 4, pp. 321-340.

Schmittlein et al., "Customer Base Analysis: An Industrial Purchase Process Application", Marketing Science, vol. 13, No. 1, Winter 1994, pp. 41-67.

Smith, Richard M., "The Web Bug FAQ", Nov. 11, 1999, Version 1.0, pp. 4.

"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.

"SRC Delivers Industry's First Drive Time Engine Developed to Follow Actual Road Networks," thomasnet.com, May 21, 2006, 4 pages, http://news.thomasnet.com/companystory/485722.

Stein, Benchmarking Default Prediction Models: Pitfalls and Remedies in Model Validation, Moody's KMV, Revised Jun. 13, 2002, Technical Report #020305; New York.

Sweat, Jeff; "Know Your Customers," Information Week, Nov. 30, 1998, pp. 20.

Tao, Lixin, "Shifting Paradigms with the Application Service Provider Model"; Concordia University, IEEE, Oct. 2001, Canada.

TARGUSinfo: Lead Verification, Verify Your Leads With Unique Accuracy and Ease, downloaded from www.targusinfo.com/solutions/verify/Default.asp, as printed Aug. 1, 2006.

TARGUSinfo: Solutions: Services: Verify Express—Verify, Correct and Enhance Customer Provided Data, downloaded from http://web.archive.org/web/20051028122545/http://www.targusinfo.com/solutions/services/verify/, Oct. 28, 2005, as printed Apr. 30, 2011, 27 pgs.

Thoemmes, Felix, "Propensity Score Matching in SPSS", Center for Educational Science and Psychology, University of Tübingen, Jan. 2012.

TransUnion, "DecisionEdge | MobileCredit", https://www.transunion.co.za/resources/transunion-za/doc/product/resources/product-decisionedge-acquisition-mobilecredit-as.pdf, 2015, pp. 2.

UPI, "Nielsen Media Research goes electronic," Jun. 14, 2006, 1 page.

"VOD Integration Now Available in Strata: Buyers / Sellers Benefit from VOD Component on Popular Platform," stratag.com, Feb. 21, 2006, 1 page, http://www.stratag.com/news/mediapress022106.html.

Warshaw, Paul R., "A New Model for Predicting Behavioral Intentions: An Alternative to Fishbein", Journal of Marketing Research, May 1980, vol. XVII, pp. 153-172.

Webber, Richard, "The Relative Power of Geodemographics vis a vis Person and Household Level Demographic Variables as Discriminators of Consumer Behavior," CASA:Working Paper Series, http://www.casa.ucl.ac.uk/working_papers/paper84.pdf, Oct. 2004, pp. 17.

White, Ron, "How Computers Work", Millennium Edition, Que Corporation, Indianapolis, IN, Sep. 1999, pp. 284.

Whitney, Daisy; Atlas Positioning to Shoulder VOD Ads; Campaign Management Tools Optimize Inventory, TelevisionWeek, May 23, 2005, 3 pages.

(56) References Cited

OTHER PUBLICATIONS

Wyner, "Customer valuation: Linking behavior and economics", Aug. 1996, Marketing Research: A Magazine of Management & Applications vol. 8, No. 2 pp. 36-38.
Yoon, Chang Woo; "Vicarious Certification and Billing Agent for Web Information Service", High Spped Network Access Section, Electronics and Telecommunications Research Institute, Jan. 21-23, 1998, pp. 344-349.
Yun et al., "An Efficient Clustering Algorithm for Market Basket Data Based on Small Large Ratios," Computer Software and Applications Conference, Oct. 2001, pp. 505-510.
Zen et al., "Value-Added Internet: a Pragmatic TINA-Based Path to the Internet and PSTN Integration", Global Convergence of Telecommunications and Distribute Object Computing, Nov. 17-20, 1997, pp. 10.
Declaration of Paul Clark, DSc. For Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings. Inc., et al.* v. *Experian Marketing Solutions. Inc.*, No. 2:12-cv-00513-JRG (E.D. Tex.)) filed Jan. 14, 2014 in 9 pages.
First Amended Complaint in Civil Action No. 2:12-cv-511-JRG (*Rpost Holdings, Inc. and Rpost Communications Limited V. Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited V. Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited V. Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. App. No. 08/845,722 by Venkatraman et al., Exhibit A, Part 1 & 2, pp. 32.
Official Communication in Canadian Patent Application No. 2,381,349, dated May 17, 2013.
Official Communication in Canadian Patent Application No. 2,381,349, dated Jul. 31, 2014.
International Preliminary Examination Report in International Application No. PCT/US00/21453 dated, Jun. 26, 2001.
International Search Report and Written Opinion for Application No. PCT/US2007/021815, dated Sep. 5, 2008.
International Search Report and Written Opinion for Application No. PCT/US2008/064594, dated Oct. 30, 2008.
International Preliminary Report and Written Opinion in PCT/US2008/064594, dated Dec. 10, 2009.
International Search Report and Written Opinion for Application No. PCT/US2008/083939, dated Jan. 29, 2009.
International Search Report and Written Opinion for Application No. PCT/US09/60393, dated Dec. 23, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.
International Search Report and Written Opinion for Application No. PCT/US2017/048265, dated Dec. 5, 2017.
International Preliminary Report on Patentability in Application No. PCT/US2017/048265, dated Mar. 7, 2019.

\* cited by examiner

MOBILE DEVICE SIGHTING LOCATION ANALYTICS AND PROFILING SYSTEM

CROSS-REFERENCE TO RELATED APPLICATIONS

This application is a continuation of U.S. patent application Ser. No. 16/698,546, filed Nov. 27, 2019, which is a continuation of U.S. patent application Ser. No. 14/748,675, filed on Jun. 24, 2015, which claims priority from provisional U.S. Pat. Appl. No. 62/016,989, filed on Jun. 25, 2014, each of which is hereby incorporated by reference in its entirety for all purposes.

BACKGROUND

Consumers carry and use mobile or portable computing devices nearly everywhere. These mobile computing devices increasingly are connected to wireless networks, such as cellular service networks and the Internet. Connectivity is often provided by mobile service providers which offer vast network capability, typically implemented by a complex network of cellular towers installed in a large number of physical locations, in addition to local Wi-Fi networks connected to the Internet. When consumers use their mobile computing devices to access a network, such as to place a phone call, send a text message, use an application on their mobile device, or access the Internet, mobile service providers can often receive or detect an approximate geographic location of the mobile computing device. This geographic location data which may be of value to mobile service providers as well as businesses and advertisers, who may generate and provide targeted advertising to consumers based on the geographic location data.

SUMMARY

The present disclosure describes systems and methods for providing enhanced location analysis and consumer insights using mobile sightings data. An approximate geographic location is useful to mobile service providers and advertisers who wish to provide targeted content to consumers based on their location. However, the location analysis provided by the systems and methods described herein provide more depth and detail not just about the detected geographic location of the consumer, but also insights into business locations visited by the user of the device, consumer/market segments and patterns of behavior (for an individual consumer and/or for aggregated group of consumers), retail trends and patterns, and other profile information.

In many instances a mobile service provider can only detect an approximate geographic location associated with a mobile sighting generated by a mobile computing device used by a consumer. A location profile analytics system, such as the one described herein, can analyze data associated with the mobile sighting to determine a probability that the approximate geographic location actually corresponds to a specific geographic location, such as a business location. Thus, the location profile analytics system may determine that a mobile sighting within a certain range of a plurality of business locations is most likely to have originated from a particular business location.

The analysis performed by the location profile analytics system may be further refined and concentrated to a particular business location based on a number of input parameters in addition to the approximate geographic location. For example, a mobile sighting might include additional data regarding the time and date of the sighting, which the location profile analytics system can comparatively analyze along with other sightings (both concurrent and prior sightings) and sightings trends, in order to assess a general likelihood that the mobile sighting originated from one business location over another. For example, one business location may receive higher retail traffic than another at certain times or days of the week, and such profile information can be used to analyze a mobile sighting to determine a business location from which the mobile sighting likely occurred.

In another example, the location profile analytics system may comparatively analyze patterns of mobile sightings associated with a device or with a user of a device in order to derive a behavior profile as an input to assess a general likelihood that the mobile sighting originated from one business location over another based on, for example, the user's observed tendencies to visit different types of business location by category, time of day, etc. Further, a mobile sighting might include additional data indicating a unique identifier associated with an anonymous consumer profile, which the location profile analytics system can use to develop, access, or link to consumer attributes such as consumer behavior/trends, market segments, demographics, and so on. These "expanded" consumer attributes, linked to the mobile computing device of the consumer, may be also analyzed to assess a general likelihood that the mobile sighting originated from one business location over another. For example, a consumer profile may including sightings trend data that suggests that the consumer using the mobile computing device prefers stopping for coffee on the way to work. The location profile analytics system may in turn use this consumer profile data to analyze a new sighting which occurred nearby to several businesses, including a coffee shop, and determine that the sighting most likely occurred at the coffee shop. Additional consumer insights may also be determined based on the consumer's profile or associated attributes—for example, that the coffee-on-the-way-to-work-consumer is associated with a group of consumers who have above average incomes and generally buy a lot of books.

The location profile analytics system can provide the detailed location information, consumer profile/attributes, and/or other business location data back to the mobile service provider or other third party entity (such as business locations themselves), which can in turn use the analysis to improve marketing efforts and/or provide more targeted content to consumers associated with the mobile sightings. For example, a mobile service provider may find data indicating that a mobile sighting most likely occurred at a certain retail establishment useful in providing targeted content (such as a coupon or a special offer) related to that retail establishment for the consumer to use. Or, a business location may desire to have information regarding retail traffic trends, based on associated mobile sightings, to improve business operations and customer service or assess the attractiveness of a potential new location.

DETAILED DESCRIPTION

High Level Data Flow

Figure 1:
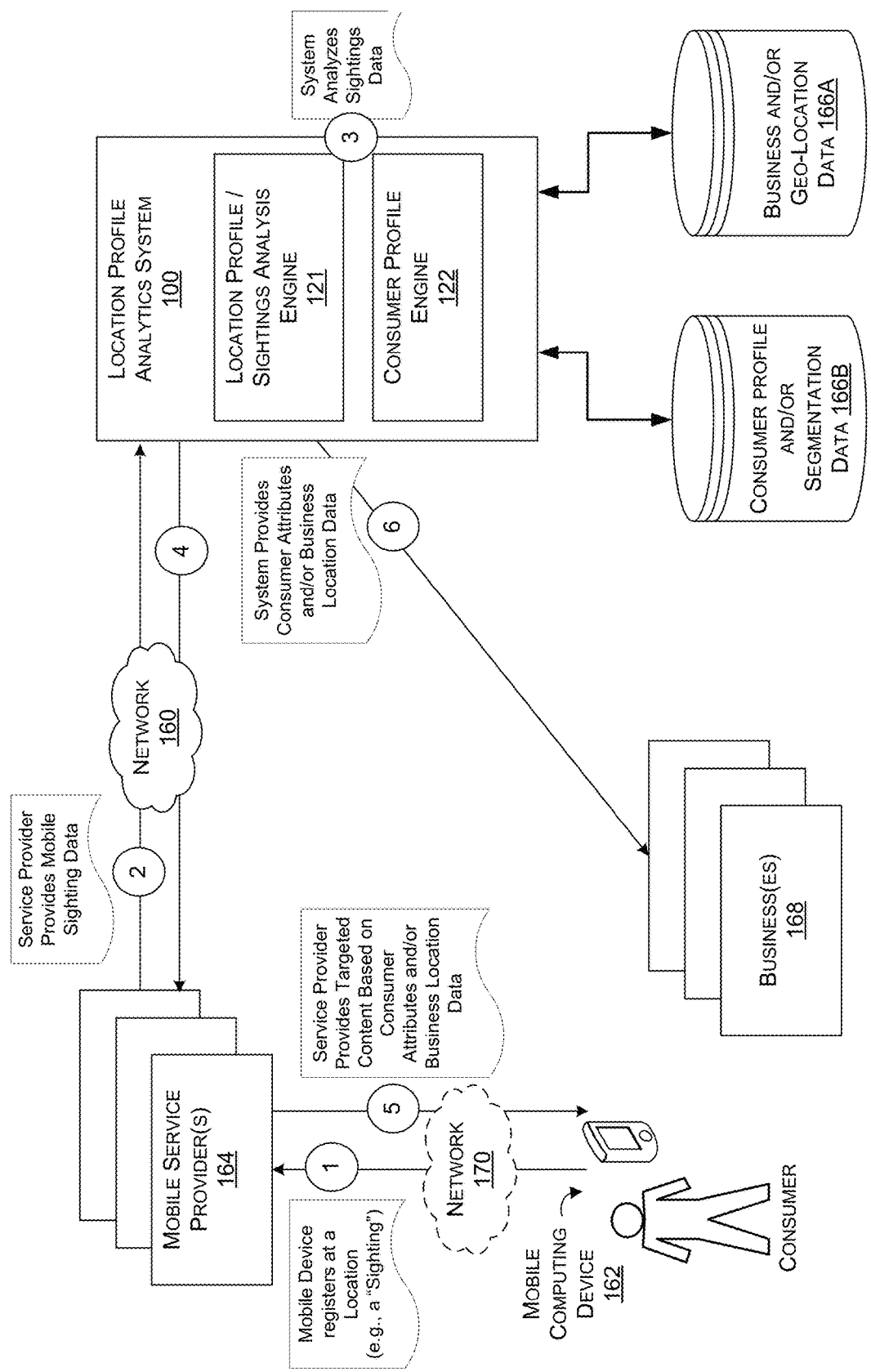
FIG. 1 is a block diagram which illustrates an exemplary data flow between a consumer device, mobile service provider, a location profile analytics system, and one or more business locations according to one embodiment.

FIG. 1 is a block diagram which illustrates an exemplary data flow between a consumer's mobile computing device(s) (e.g., a smart phone, a tablet, or other portable electronic computing device) 162, a mobile service provider(s) 164, a location profile analytics system 100, and business location(s) 168, according to one embodiment. The data flow of FIG. 1 illustrates at a high level how a mobile sighting may be analyzed to determine a probable business location from which the mobile sighting originated or occurred, and to determine consumer insights regarding the consumer associated with the mobile sighting to improve targeted content (e.g., marketing, advertising, or similar) provided to the consumer.

Beginning at action (1), a consumer's mobile computing device 162 registers its location (a "sighting") at or near locations of one or more businesses 168. For example, the mobile computing device 162 may register its location actively (e.g., when the user of the device places a call, sends a text message, uses an application, etc.), or the mobile computing device 162 may register its location passively such as when an application that is running in the background periodically sends location information to a remote system, such as the mobile service provider 164. The use may be any type of device usage that involves or may be detected by a mobile service provider 164 which provides mobile service for the consumer. For example, the consumer may place a call or send a text or SMS message over a network 170 in communication with the mobile service provider 164. Or, the consumer may access an application ("app") installed on her mobile computing device 162 in order to access, request, send, and/or receive data over the network 170, such as may occur when the consumer uses the app to access services such as maps, social media, etc.

The mobile service provider may receive data (e.g., a mobile sighting) associated with the usage, such as a device identifier associated with the mobile computing device 162, a consumer identifier associated with the mobile computing device 162 and/or with the consumer (e.g., an identifier associated with the consumer regardless of the specific mobile computing device used), data about the type of use (e.g., a voice call, a text message, an app use, etc.), location data indicating approximately where the use occurred (e.g., latitude and longitude coordinates, Global Positioning System ("GPS") coordinates, street addresses, or other location-identifying data of any level of granularity and/or ranges), and/or a date/time at which the use occurred.

In the particular example described here with respect to FIG. 1, a single usage event may be involved. However, as will be described in more detail throughout this disclosure, in some embodiments any number of usage events may be involved, such that the mobile service provider 164 may receive many hundreds, thousands, millions, or more of such usage events across many hundreds, thousands, millions, or more mobile computing devices associated with consumers who subscribe to the mobile service provider 164.

To provide an ongoing illustrative, non-limiting example to which will be referred throughout the description of FIG. 1, consider a hypothetical consumer Angie using her smart phone on a typical weekday. At action (1), Angie may use her smart phone to access and check her e-mail while waiting for coffee at her favorite coffee shop on the way to work in the morning at 7:30 am. The coffee shop may be located in a retail shopping area nearby to other business and/or retail locations, such as restaurants, markets, shopping, and various other retail services. Angie's mobile service provider 164 may receive usage data associated with this event, for example, data indicating that the smart phone (which may be uniquely identified via an identifier as discussed above) was used at a location near the coffee shop (the location may be exact or an approximate range or radius in proximity to the coffee shop), at the particular time of day (e.g., 7:30 am), to access data over the network 170 (e.g., Angie's e-mail). The mobile service provider 164 may receive and collect mobile sighting data associated with multiple usage events for Angie throughout the day as she uses her smart phone.

At action (2), the mobile service provider 164 may provide mobile sighting data to a location profile analytics system 100 for analysis. The mobile sighting data may include data for one or more mobile sightings, for one consumer (e.g., Angie in the ongoing example) or for any number of consumers. For example, Angie's coffee stop may be provided to the location profile analytics system 100 in real-time for analysis so that the mobile service provider 164 may immediately use any generated location data, such as to provide a coupon, advertisement, or other information to Angie that may be of use while she is at the coffee shop. In other embodiments, mobile sightings data may be collected and sent to the location profile analytics system 100 in batches on a periodic basis (e.g., hourly, daily, weekly, monthly, etc.) for more comprehensive analysis and processing across multiple sightings and/or multiple consumers.

At action (3), the location profile analytics system 100 analyzes the sightings data received from the mobile service provider 164. The analysis may be performed by the location/profile sightings analysis engine 121 and/or the consumer profile engine 122, for example as discussed in more detail as illustrated and described with reference to processes 300, 400, and 500 of FIGS. 3, 4, and 5 respectively. The location profile analytics system 100 may access one or more data sources, including a business and/or geo-location data source 166A, and/or a consumer profile and/or segmentation data source 166B as part of the location analysis processes described herein. In some embodiments, such as the embodiment illustrated in FIG. 6, the mobile sightings data may be accessed directly from a mobile sightings data source 166C, either in conjunction with or instead of being received from the mobile service provider 164. For example, mobile sightings data source 166C may be maintained by the mobile service provider 164 or by a third party entity, and the location profile analytics system 100 may be granted permission to access the mobile sightings data source 166C directly.

In one embodiment, the location profile analytics system 100 may, as a result of the analysis performed on the mobile sighting data, determine a business location associated with one or more mobile sightings. The business location may be determined based on a variety of factors, including the date and time of the mobile sighting, the proximity of the geo-location data associated with the mobile sighting to one or more business locations, data associated with the one or more business locations, and/or consumer profile data which may be associated with a particular consumer mobile sighting or with multiple consumer mobile sightings, and other criteria discussed herein.

For example, the location profile analytics system 100 may receive a mobile sighting for the smart phone associated with Angie corresponding to her coffee shop usage described in the ongoing example. The mobile sighting may only include a general geo-location or approximate range, such that the mobile sighting could have occurred at another business or retail location within the area (e.g., one of the nearby restaurants, shops, or other retail services). In one embodiment, the location profile analytics system 100 may determine that the mobile sighting was most likely or probable to have occurred at the coffee shop based on a number of factors considered alone or in combination. For example, the location profile analytics system 100 may access data from the business and/or geo-location data source 166A to identify one or more business locations which may be candidates based on their known location and general proximity to the geo-location data of the mobile sighting. The location profile analytics system 100 may determine, based on this data, that the only candidate business location open for business at 7:30 am is Angie's coffee shop, and determine that the mobile sighting most likely occurred at the coffee shop.

In another instance, the location profile analytics system 100 may access consumer profile data associated with Angie's smart phone (e.g., linked to an identifier associated with Angie's smart phone) which indicates that historically Angie visits coffee shops more frequently than the average consumer, or typically visits the particular coffee shop at around the same time of day (or within a range, such as between 7 am-8 am), from which the location profile analytics system 100 may determine that the mobile sighting most likely occurred at the coffee shop.

In yet another instance, the location profile analytics system 100 may access consumer profile or segment data associated with multiple consumers and business locations which may indicate that the relative frequency of sightings within a certain geographic and/or time of day range of the mobile sighting by business category or specific business location. (e.g., perhaps sightings at or near coffee shops are 5 times as likely between 6 am and 9 am). Thus, the location profile analytics system 100 may determine that another sighting within range of the coffee shop in the morning most likely did occur at the coffee shop.

Continuing to action (4), the location profile analytics system 100 provides consumer attributes and/or business location data back to the mobile service provider. The mobile service provider 164 may then provide targeted content to the device and/or user such as marketing offers, personalized news feeds, personalized traffic alerts, etc.

At action (5), the mobile service provider 164 provides targeted content to the consumer's mobile computing device 162, based on the received consumer attributes and/or business location data. Targeted content may be generated and provided in a number of ways based on the business location profiles and/or consumer profiles. For example, a business location profile provided by the location profile analytics system 100 may indicate that a mobile sighting for hypothetical Angie most likely originated from a coffee shop, and in response the mobile service provider may provide a coupon or special offer for Angie to use at the coffee shop. Or, a consumer profile provided by the location profile analytics system 100 may indicate that hypothetical Angie is associated with a certain consumer profile or segment of consumers which typically go to the supermarket after the coffee shop, and in response the mobile service provider may provide a coupon or special offer for Angie to use at the supermarket after her coffee shop stop.

At action (6), in some embodiments, the location profile analytics system 100 may provide consumer attributes and/or business location data (including business profiles) to the business(es) 168. Such data may be of use or value to a business 168 for use in customer service, marketing efforts, supply chain management, and other business management decisions. For example, targeted content for a customer of a business may be generated in a number of ways based on the business location data. For example, a business location profile provided by the location profile analytics system 100 may indicate for a hypothetical coffee shop (e.g., based on aggregated mobile sightings) what proportion of its 6 am to 9 am customer volume is from mobile device users who work nearby, which might then inform whether or not to run a promotion for a mid-afternoon break. The business 168 may also use business location profiles and/or consumer profiles in other ways, such as to measure overall retail traffic in its area and the proportion of that traffic visiting that business, inform employee staffing decisions (e.g., the coffee shop might need more employees working during peak hours in order to provide better customer service), inventory and demand forecasting (e.g., the coffee shop might be able to forecast when it will run out of coffee based on trends indicated by the business location profiles and/or consumer profiles, and preemptively order more to avoid out-of-stock situations), and so on.

Examples of Data Utilized by a Location Profile Analytics System

Figure 2:
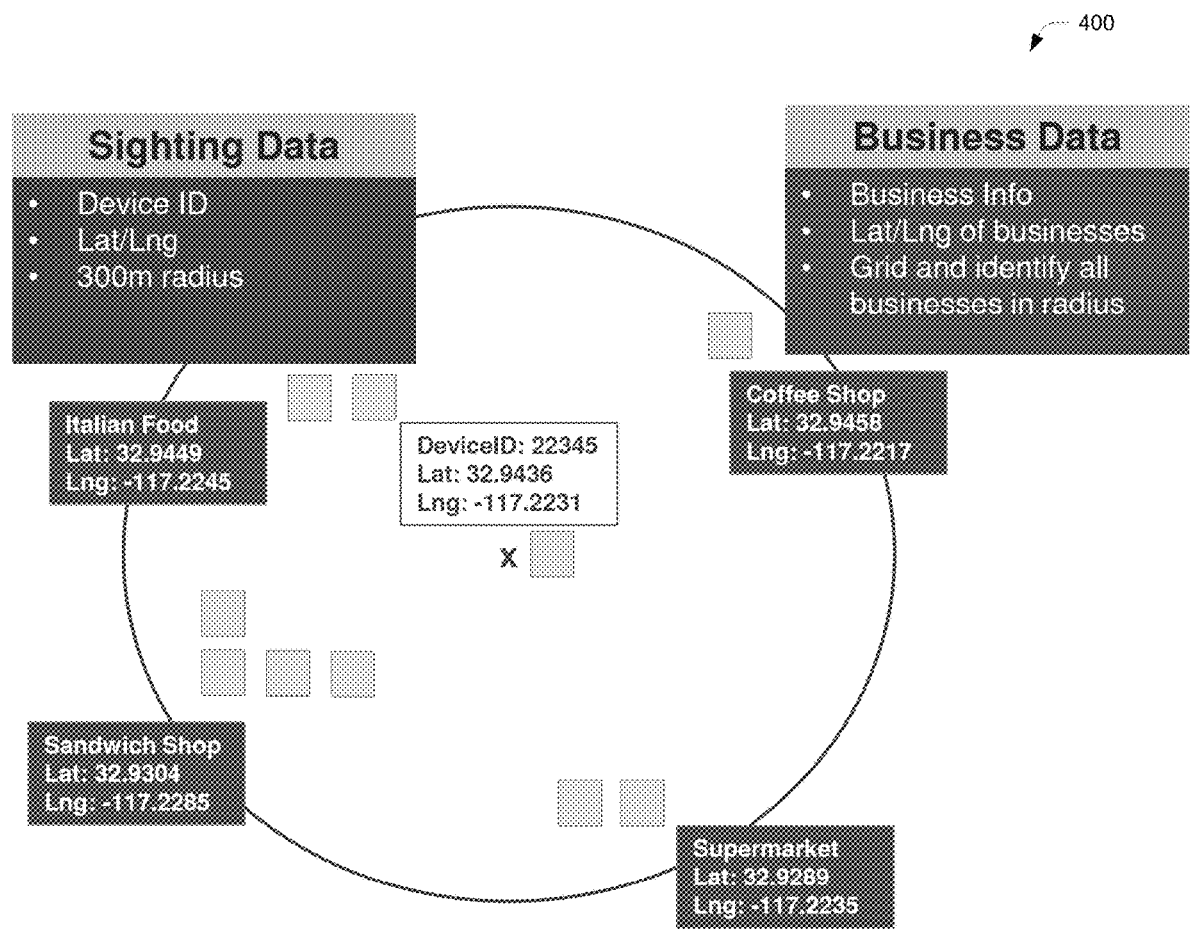
FIG. 2 is an example of sighting data and business data that may be analyzed and profiled according to the processes described herein, using the location profile analytics system of FIG. 6.
Figure 6:
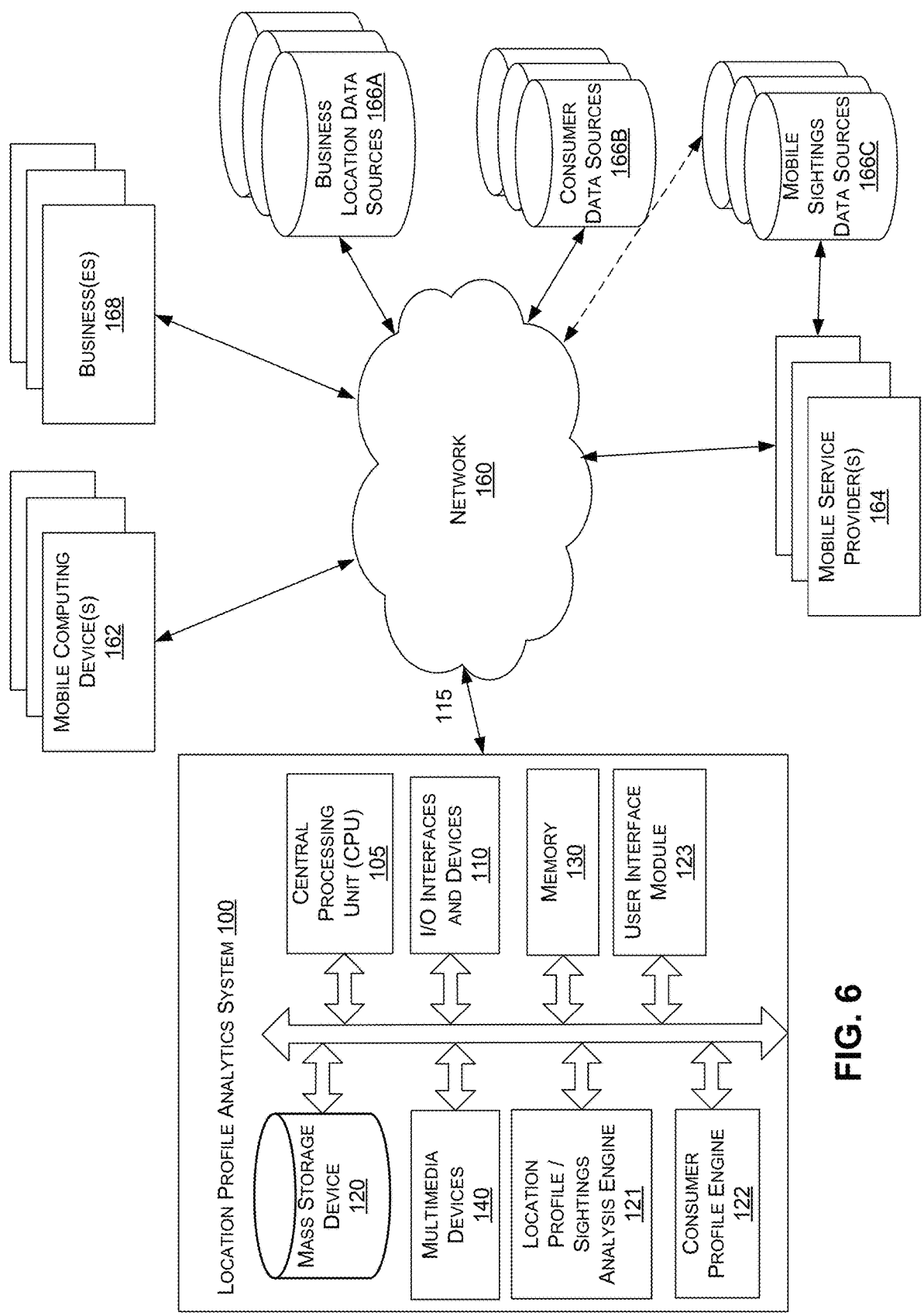
FIG. 6 is a block diagram of an implementation of an illustrative location profile analytics system.

FIG. 2 is an example of a mobile sighting, sighting data, and business data that may be analyzed and profiled according to the processes described herein, using the location profile analytics system 100 of FIG. 1 or FIG. 6. In the example, a mobile sighting is shown which includes at least a deviceID and geo-location data which may comprise latitude-longitude coordinates, as well as an associated accuracy range (e.g., a 300 meter radius, as shown in FIG. 2, or any other radius or range of accuracy). The mobile sighting may also include other data as described elsewhere in the present disclosure. The mobile sighting of a consumer's mobile computing device 162 may be registered by mobile service provider 164, which in turn may be sent or provided to (or otherwise accessed by) the location profile analytics system 100.

The location profile analytics system 100 may use the geo-location data associated with the mobile sighting in order to access, from a business location data source 166A, data regarding one or more candidate business locations which may be at or near the geo-location of the mobile sighting. For example, one or more businesses at or near the latitude-longitude coordinates, or within the associated distance range, may be considered as candidate business locations. As FIG. 2 illustrates, for the particular mobile sighting shown, the location profile analytics system 100 may identify an Italian food restaurant, a sandwich shop, a coffee shop, and a supermarket within range of the sighting. Other business and/or retail locations may also be identified.

As will be further described with reference to FIGS. 3, 4, and 5 herein, the location profile analytics system 100 may analyze the sighting data and/or the business data to determine, among other things, the most probable location of the mobile device sighting. For example, if the sighting data further indicates that the sighting occurred at 7:30 am, and the business data indicates that the Italian food restaurant does not open until 11:00 am, the location profile analytics system 100 may determine that the Italian food restaurant is probably not the actual location of the mobile device sighting. Other data and criteria may similarly be analyzed, including consumer profile and/or segmentation data which may indicate consumer visitation patterns and trends for various business locations within a given area or radius. Thus for example, for business locations within a given distance range, consumer patterns may indicate that the coffee shop receives the most traffic between 6 am to 8 am and 2 μm to 5 pm, the sandwich shop receives the most traffic between 11 am and 2 pm, the Italian food restaurant receives the most traffic after 6 pm, and the supermarket receives a steady flow of traffic throughout the day (or more traffic on a weekend day relative to a weekday). These patterns may be generated by the location profile analytics system 100 over time and stored for later access in analyzing subsequent mobile sightings in proximity to those business locations having associated consumer traffic patterns.

The probability of one location being the true location of a mobile sighting may depend on many factors which can vary depending on the particular embodiment. For example, proximity to the location may be given a greater weighting in all instances regardless of other factors, or the proximity may be given a lower weighting depending upon the time of day. Thus, in some instances a sighting that appears directly adjacent to the coffee shop may give a greater weighting to the coffee shop as being the true location, no matter what time of day the sighting occurred. Or, in some instances, the time of day may be given a greater weighting, such that a sighting that appears directly adjacent to the coffee shop may give a lower weighting to the coffee shop as being the true location if it occurred at 11 pm—in such a case it may be determined that the true location is much more likely to be the Italian restaurant, even though both business locations may be open for business at 11 pm and the sighting may appear farther from the Italian restaurant than the coffee shop, based on other factors (e.g., the Italian restaurant may be much more popular at 11 pm than the coffee shop, or a consumer identifier associated with the mobile sighting may indicate that the consumer rarely goes to a coffee shop, and so on).

Examples of Methods Performed by a Location Profile Analytics System

Figure 3:
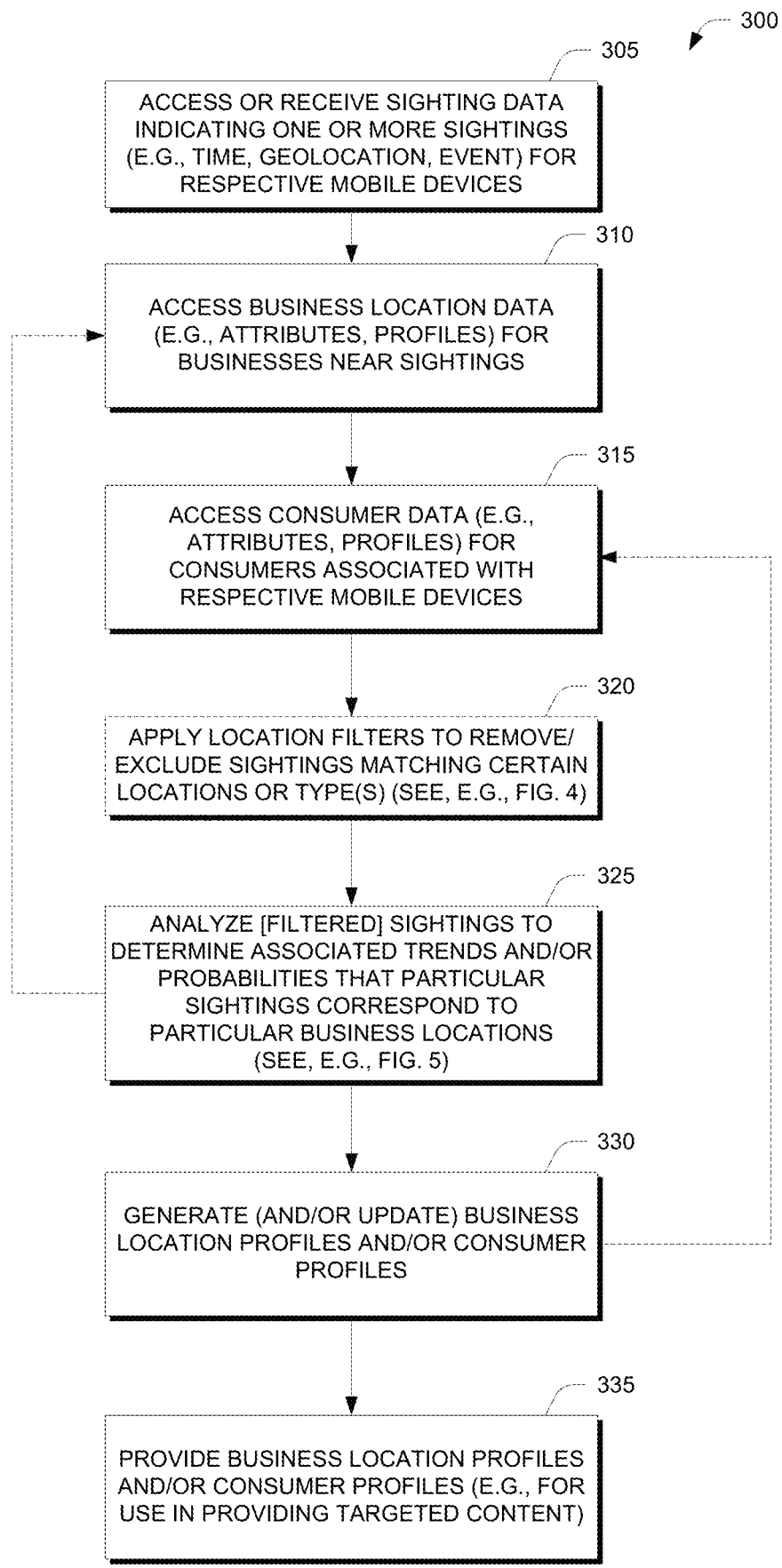
FIG. 3 is a flowchart of a process for analyzing sightings data and developing related location profiles and/or consumer profiles, using the location profile analytics system of FIG. 6.
Figure 4:
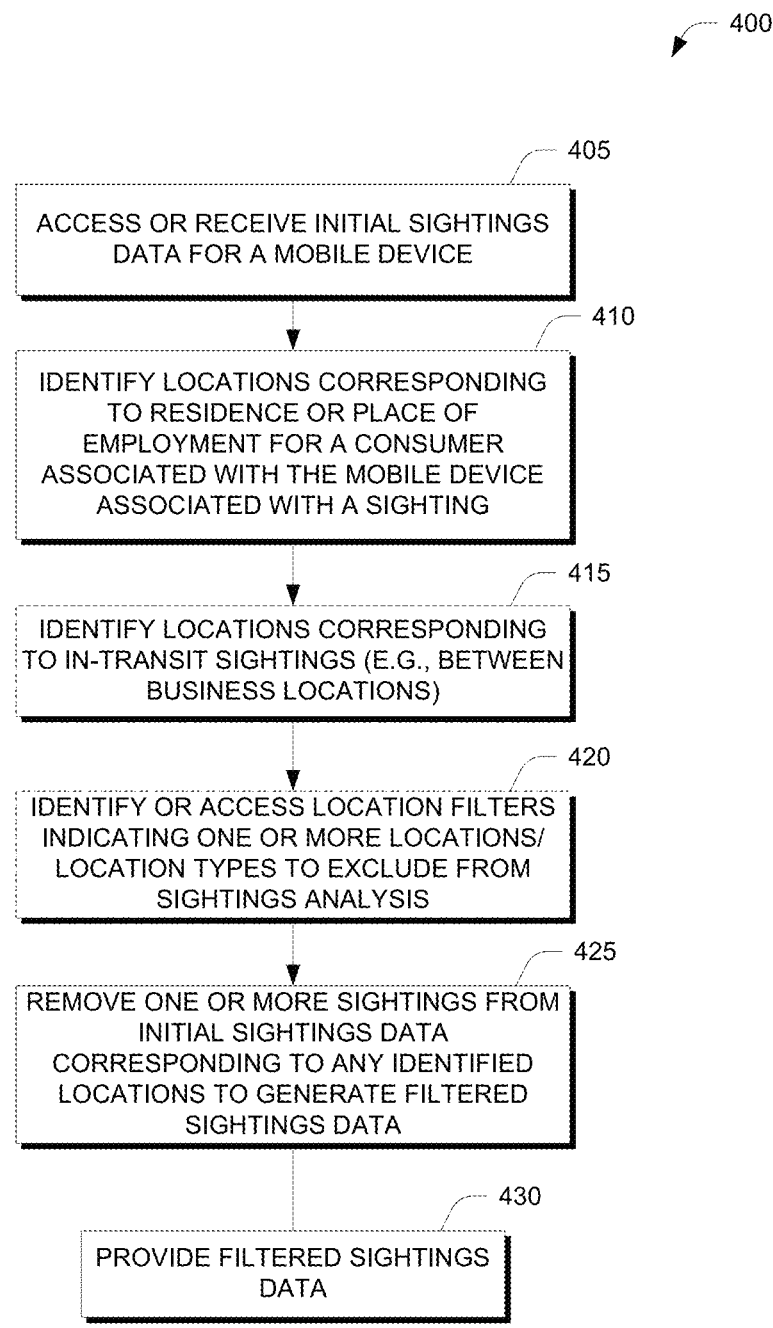
FIG. 4 is a flowchart of a process for processing and/or filtering sightings data, using the location profile analytics system of FIG. 6.
Figure 5:
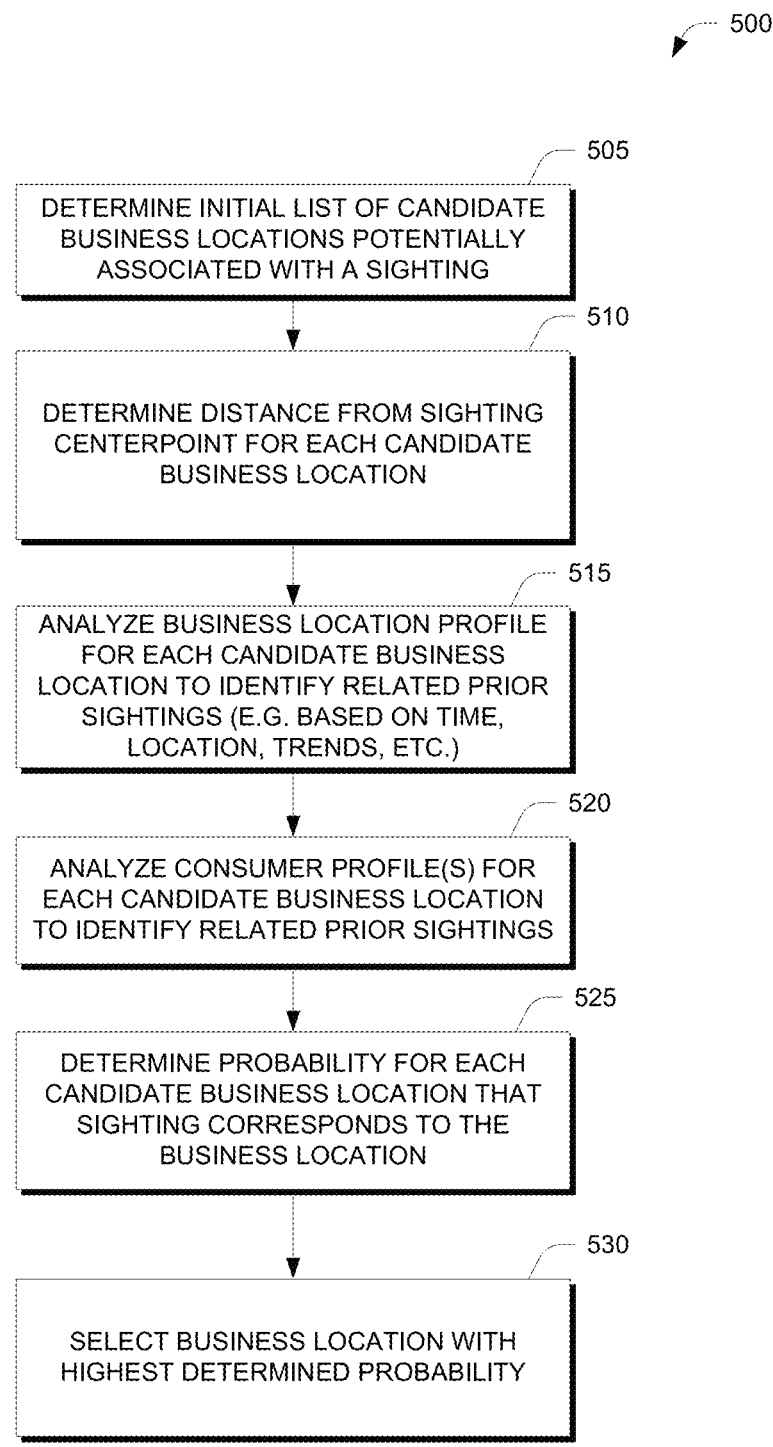
FIG. 5 is a flowchart of a process for determining probable locations associated with sightings data, using the location profile analytics system of FIG. 6.

FIGS. 3, 4, and 5 are flowcharts for various embodiments of location profile analytics system processes. In some implementations, the processes are performed by embodiments of the location profile analytics system 100 described with reference to FIG. 1 or FIG. 6, or by one or more of its components, such as the location profile/sightings analysis engine 121, consumer profile engine 122, and/or user interface module 123. The example scenarios are intended to illustrate, but not to limit, various aspects of these systems and/or services. In one embodiment, the processes can be dynamic, with some procedures omitted and others added. In one example, multiple instances of the processes may occur concurrently, for different location profile analytics systems. Depending on the embodiment, the methods may include fewer or additional blocks and/or the blocks may be performed in an order different than illustrated.

FIG. 3 is a flowchart illustrating one embodiment of a high-level process 300 for analyzing sightings data and developing related location profiles and/or consumer profiles. The process 300 may be executed, for example, by the location profile/sightings analysis engine 121 and/or the consumer profile engine 122 of the location profile analytics system 100 of FIG. 1 or FIG. 6.

At block 305, the location profile analytics system 100 accesses or receives sighting data indicating one or more sightings for respective mobile devices. Sighting data may be accessed from, for example, the mobile sightings data sources 166C, and may include data for one or more sightings. Each sighting may include a unique identifier the sighting, a unique identifier for a mobile computing device which generated the sighting, a unique and anonymous identifier for a consumer associated with the mobile computing device which generated the sighting, geo-location data for the sighting (e.g., latitude and longitude coordinates, GPS coordinates, data from towers, antennae or other network infrastructure, etc.), a date and time for the sighting, and/or a range or other indication of the accuracy of the sighting.

At block 310, the location profile analytics system 100 accesses business location data for one or more businesses that may be near the sightings (e.g., based on the geo-location data associated with a respective sighting). Business location data may be accessed from, for example, the business location data sources 166A, and may include attributes, profiles, and other data descriptive of or related to the respective business locations. For example, attributes might include a name, a type of business (e.g., food, retail/shopping, service, etc.), hours of operation (e.g., hours during which the business location is open), geo-location information (including street addresses, latitude and longitude coordinates, GPS coordinates, etc.), phone number(s), and any other information available for the business location. Profiles might include, for example, data describing consumer traffic patterns/trends for the business (e.g., which time(s) the business location appears to have a high (or low) level of traffic, which may be based in part on aggregated sightings data) and/or other businesses in the same category (e.g. coffee shops, in general). Profiles might also include ratings and related consumer feedback data, which may be accessed or gathered from popular consumer ratings websites (such as Yelp.com or similar services). The business location data may be used by the location profile analytics system 100 in order to identify one or more businesses that may be associated with the sightings data accessed at block 305, and/or to generate, improve, or enhance profiles for the business locations based at least in part on any relevant new sightings.

At block 315, the location profile analytics system 100 accesses consumer data for consumers associated with the respective mobile devices which generated or provided the mobile sightings data (e.g., based on the unique identifiers associated with a respective sighting). Consumer data may be accessed from, for example, the consumer data sources 166B, and may include attributes, profiles, and other data descriptive of or related to the respective consumers. Consumer data may also include data such as socio-economic attributes, demographics, age, lifestyle segments, behavioral/attitudinal, financial attributes including income and credit data-related attributes, and so on. Consumer data may also include profiles, segmentation or other attributes derived from historical patterns in the mobile sightings data, as determined at block 330, below. The consumer data may be used by the location profile analytics system 100 in order to identify one or more businesses that may be associated with the sightings data accessed at block 305, and/or to generate, improve, or enhance profiles for the business locations based at least in part on any relevant new sightings.

At block 320, the location profile analytics system 100 may optionally apply location filters to remove and/or exclude sightings matching certain locations, types, or other criteria. For example, location filters may be applied in order to resolve or remove sightings which may be associated with a consumer's home and/or work. Location filters may also be applied in order to resolve or remove sightings which may correspond to "in transit" or "in between sightings" which may not correspond to any business locations, in order to reduce the sightings to key times and/or waypoints. This type of filtering may also be based on analyzing differentials in speed data (e.g., a miles-per-hour ("mph") that may be associated with a sighting) between sightings. In some embodiments, sightings which are removed during the filtering process at block 320 may be saved or stored for later use. For example, "in transit" sightings might be provided for use in automotive insurance underwriting, such as to validate commute distances and approximated miles driven per year to assess proper or more accurate insurance premium calculations. One example of how the filtering at block 320 may be performed is illustrated and discussed in further detail herein with respect to process 400 of FIG. 4.

At block 325, the location profile analytics system 100 analyzes the (filtered) sightings data to determine associated trends and/or probabilities that particular sightings correspond to particular business locations. For example, the analysis may be based on a weighted average based on multiple factors or inputs, such as: a distance from a center point of a sighting to a particular business location; prior sightings, trends, or patterns based on a particular business type or time of day; prior sightings, trends, or patterns based on consumer segments, profiles, or attributes; and so on. One example of how the sightings analysis at block 325 may be performed is illustrated and discussed in further detail herein with respect to process 500 of FIG. 5. In some embodiments, after analyzing the sightings data at block 325, the process 300 may return to block 310 and repeat the processes performed at blocks 310 through 325 in order to further refine the trends and probabilities associated with the respective sightings and business locations.

At block 330, the location profile analytics system 100 generates and/or updates business location profiles and/or the consumer profiles based on the results of the sightings analysis performed at block 325 and/or process 500 of FIG. 5. For example, business location profiles may be updated to reflect better or more accurate time of day and/or consumer segment profiles over time as more sightings data are aggregated and analyzed. Business location profiles may include location traffic counts and related data, including a number of sightings per unit time (e.g., by hour/time of day, by day, by week, by month, etc.); a number of sightings per consumer segment, profile, or attributes (e.g., an "X" number of sightings may be associated with consumers of a certain age group, income level, or other consumer data attribute variable); a number of sightings per type of trip (e.g., commuting, shopping, etc.); and so on. Business location profiles may also include approximated or exact lengths of stay at (or near) the business location, as well as information about previous and/or next destinations associated with sightings which occur before and/or after sightings at or near the business location. For example, a first business location may develop a profile over time that indicates a high number of consumers visit a second business location immediately following a visit to the first business location—e.g., some consumers may go to the coffee shop and then the supermarket.

Similarly, consumer profiles may be updated to reflect better or more accurate segment profiles or consumer-specific profiles over time as more sightings data are aggregated and analyzed. Consumer profiles may be generated based on or using various clustering techniques in order to determine certain segment characteristics, such as commute distance, frequencies of visiting various retail and other locations which may be organized by categories and sub-categories, demographic and socioeconomic profiles, and so on. Consumer profiles may also include aggregated segment prevalence data such as micro-geographic aggregation based on home and/or work location sightings. For example, the percentage of consumers who work in a given area might be tabulated according to the area in which they live, the length of their commute, the proportion that routinely stop for coffee on the way to work, etc. One possible result of the consumer profile analysis would be to link or associate an anonymous consumer identifier with particular consumer segments and/or behaviors, such that sightings associated with the consumer identifier may be mapped to the particular consumer segments. In some embodiments, after generating the business location and/or consumer profiles at block 330, the process 300 may return to block 315 and repeat the processes performed at blocks 315 through 330 in order to further refine the profiles associated with the respective sightings and business locations.

At block 335, the location profile analytics system 100 provides the business location profiles and/or consumer profiles to a requesting entity. The business location profiles and/or consumer profiles may then be used by the requesting entity to provide targeted content to consumers, such as targeted advertising, coupons, special offers, customized news feeds, personalized traffic alerts, and the like.

For example, as discussed in more detail with respect to FIG. 1, in one embodiment the business location profiles and/or consumer profiles may be provided to a mobile service provider 164 (e.g., the mobile service provider which provided or otherwise made available to the location profile analytics system 100 the mobile sightings data analyzed during the process 300). The mobile service provider 164 may then provide targeted content such as marketing offers to its subscribers, such that the targeted content may be generated in a number of ways based on the business location profiles and/or consumer profiles. For example, a business location profile provided by the location profile analytics system 100 may indicate that a mobile sighting for hypothetical Angie most likely originated from a coffee shop, and in response the mobile service provider may provide a coupon or special offer for Angie to use at the coffee shop. Or, a consumer profile provided by the location profile analytics system 100 may indicate that hypothetical Angie is associated with a certain consumer profile or segment of consumers which typically go to the supermarket after the coffee shop, and in response the mobile service provider may provide a coupon or special offer for Angie to use at the supermarket after her coffee shop stop.

In another embodiment, the business location profiles and/or consumer profiles may be provided to a business 168. The business 168 may then provide targeted content such as marketing offers to its customers, such that the targeted content may be generated in a number of ways based on the business location profiles and/or consumer profiles. For example, a business location profile provided by the location profile analytics system 100 may indicate for a hypothetical coffee shop (e.g., based on aggregated mobile sightings) what proportion of its 6 am to 9 am customer volume is from mobile device users who work nearby, which might then inform whether or not to run a promotion for a mid-afternoon break. The business 168 may also use business location profiles and/or consumer profiles in other ways, such as to measure overall retail traffic in its area and the proportion of that traffic visiting that business, inform employee staffing decisions (e.g., the coffee shop might need more employees working during peak hours in order to provide better customer service), inventory and demand forecasting (e.g., the coffee shop might be able to forecast when it will run out of coffee based on trends indicated by the business location profiles and/or consumer profiles, and preemptively order more to avoid out-of-stock situations), and so.

In another embodiment, the business location profiles and/or consumer profiles may be provided to other types of third party entities. For example, lenders or lending institutions may be provided with business location profiles in order to determine or assess and associated level of credit risk or fraud which may be associated with a business location. For example, a lender may wish to compare financial or earnings reports from a business location to the business location profile in order to determine or assess whether the earnings reports appear to be accurate: reported high earnings coupled with relatively low traffic counts from the business location profile may signal to the lender that the business location may be fraudulently reporting its earnings. The lender may also wish to measure traffic counts at a business location in relation to those of other comparable businesses in order to gauge relative market share, or measure trends in traffic counts at a business location as part of an assessment of the business location's future prospects. Or, a lender may wish to view business location profiles for areas near a newly proposed business location in order to assess the credit risk of the new venture: high traffic counts for a given area (such as retail shopping mall), particularly among desired consumer segments, may signal a much lower credit risk for a proposed new business location in the given area that caters to those consumer segments.

FIG. 4 is a flowchart illustrating one embodiment of a high-level process 400 for processing and/or filtering sightings data. The process 400 may be executed, for example, by the consumer profile engine 122 of the location profile analytics system 100 of FIG. 1 or FIG. 6. For ease of illustration the example described throughout the description of the process 400 involves one or more sightings associated with one mobile device, but the process may be applied to multiple sightings associated with multiple mobile devices being analyzed in parallel.

At block 405, the location profile analytics system 100 accesses or receives initial sighting data for a mobile device. The initial sighting data may be accessed from, for example, the mobile sightings data sources 166C, and may include data for one or more sightings for the mobile device. In one embodiment the initial sighting data may be accessed as part of the process 300 (e.g., at block 305), or otherwise provided to the location profile analytics system 100 or one of its components in conjunction with the process 300.

At block 410, the location profile analytics system 100 identifies one or more locations which may correspond to a residence (e.g., home) or place of employment (e.g., work) for a consumer associated with the mobile device associated with a sighting. For example, the location profile analytics system 100 may access consumer profile data from the consumer data sources 166B, based at least in part on a unique identifier associated with the sighting for the mobile device. The consumer profile data may include residence location data and/or employment location data for the consumer, which the location profile analytics system 100 can analyze and compare to the geo-location data associated with the sighting (e.g., determine if either (1) the residence location data and/or (2) the employment location data matches, or is in close proximity to, the geo-location data associated with the sighting). Mobile sightings associated with estimated residence and/or employment locations may be excluded from further location analysis in order to improve the efficiency and accuracy of the overall sightings analysis process, for example when millions of sightings are being analyzed substantially in parallel and in real time.

At block 415, the location profile analytics system 100 may optionally identify one or more locations which may correspond to in-transit sightings (e.g., sightings which appear to not be associated with any particular location of interest, or that appear to correspond to locations in-between business locations). For example, one set of sightings data for a mobile device may include twenty hypothetical sightings: three sightings at or near a coffee shop, five sightings at or near a supermarket 2 miles away, and twelve sightings at or near a highway between the coffee shop and the supermarket. The twelve sightings at or near the highway may be identified as in-transit sightings that may be excluded from further analysis (unless, perhaps, those sightings might correspond to other business locations along the highway). Removing in-transit sightings can improve the efficiency and accuracy of the overall sightings analysis process, for example when millions of sightings are being analyzed substantially in parallel and in real time.

At block 420, the location profile analytics system 100 may optionally identify or access location filters indicating one or more locations and/or location types which may be excluded or removed from the sightings analysis. In some embodiments, location filters may be associated with a requesting entity (e.g., a mobile service provider, a business location, or other third party) that is interested in analysis related only to sightings for particular locations or types. For example, a coffee shop may only interested in retail sightings and thus desire to have non-retail business locations excluded from the sightings analysis. Other entities may have their own business-specific rules or reasons for excluding certain locations or location types, and the location profile analytics system 100 may store or otherwise have access to customized filters which reflect those business rules or reasons, and apply the filters to sightings data when a request is received from those particular entities which have customized filters.

At block 425, the location profile analytics system 100 removes one or more sightings from the initial sightings data which correspond to any of the identified locations at blocks 410, 415, and 420 in order to generate a set of filtered sightings data. In some instances, none of the identified locations may need to be excluded or removed from the sightings analysis (e.g., no locations are identified at blocks 410, 415, and 420), and thus the filtered sightings data may include all of the sightings in the initial sightings data (e.g. none of the sightings may be removed).

At block 430, the location profile analytics system 100 provides the filtered sightings data. The filtered sightings data may be provided to another process performed by the location profile analytics system 100, such as the process 300 of FIG. 3 (e.g., after block 320). In some embodiments the filtered sightings data may be provided to a requesting entity or a third party for further analysis and data processing similar to the process 300 of FIG. 3.

FIG. 5 is a flowchart illustrating one embodiment of a process 500 for determining probable locations associated with sightings data. The process 500 may be executed, for example, by the consumer profile engine 122 of the location profile analytics system 100 of FIG. 1 or FIG. 6. The process 500 may be for example a sub-routine which is invoked as part of the process 300 of FIG. 3, for example at block 320, to determine a probable location associated with a mobile sighting.

At block 505, the location profile analytics system 100 determines an initial list of candidate business locations potentially associated with a sighting. The initial list of candidate business locations may be determined based on proximity to the sighting. In one embodiment, the initial list of candidate business locations might include all business locations within a certain radial distance of the sighting or within a certain radial distance of the range of the sighting, based on the geo-location data associated with the sighting). For example, the initial list of candidate business locations might include all business locations within 1000 feet of the geo-location of the sighting.

In another embodiment, the initial list of candidate business locations might include all business locations within a geographic unit or area (e.g., one or more ZIP codes, ZIP+4 codes, or any size of geographic unit) that is at or near the sighting. For example, the location profile analytics system 100 might determine that the sighting occurred in a certain ZIP+4 code, and the initial list of candidate business locations may be determined to include any business locations sharing the same or nearby ZIP+4 codes.

In another embodiment, the initial list of candidate business locations might include all business locations sharing a common geographic attribute that is also shared or associated with the geo-location of the sighting. For example, the location profile analytics system 100 might determine that the sighting occurred in a retail shopping center, and the initial list of candidate business locations may be determined to include any business locations located within the retail shopping center.

At block 510, the location profile analytics system 100 determines, for each candidate business location, distances (either actual or approximated) from a center point associated with the sighting. As previously described, a sighting may correspond to a range or area of geographic coordinates (e.g., within U distance of a point {X, Y, Z}). Thus, the location profile analytics system 100 may initially calculate an associated center point to approximate the location of the sighting (in some instances the center point may be the geographic coordinates, if known). Using location data associated with each of the business locations on the initial candidate list, the location profile analytics system 100 can determine the distance between each business location and the sighting. One example of this is illustrated and described with reference to FIG. 2 herein. The determined distances may then be used, for example, as one factor in the probabilistic location determination performed at block 525, described below. For example, the location profile analytics system 100 may determine that a first business location within a closer distance of the sighting is more likely the business location of the sighting than a second business location farther from the sighting.

At block 515, the location profile analytics system 100 analyzes business location profiles for each candidate business location to identify related prior sightings (e.g., based on time, location, trends, etc.). Business location profiles might include information indicating, for example, a certain time or times at which sightings have previously occurred a given business location and/or other comparable business locations in the same category. Business location profiles may also include specific attributes of the business location such as hours of operation. Thus, the hypothetical coffee shop might have more sightings at 7 am than at 10 am, while a hypothetical night club or bar might have more sightings at 11 pm than at 11 am. However, the hypothetical coffee shop might also have more sightings at 11 am than the bar at 11 am. These profiles and trends can be analyzed and compared to the time of the sighting as one factor the probabilistic location determination performed at block 525, described below. For example, if the sighting occurred at 7 am or 11 am the location profile analytics system 100 may determine that the sighting more likely occurred at the coffee shop than the bar.

At block 520, the location profile analytics system 100 analyzes consumer profiles for each candidate business location to identify related prior sightings. For example, consumer data may indicate that consumers associated with a particular market segment, demographic, or other attribute tend to visit certain business locations more than others. The sighting might include an identifier for the consumer which the location profile analytics system 100 can use to look up or determine an associated consumer profile. Each candidate business location can then be compared to the associated consumer profile to determine a probability (or a factor weighing in a probability determination) that the consumer associated with the sighting would visit the candidate business location. For example, hypothetical Angie might be associated with a consumer profile or segment of commuters who tend to frequent coffee shops often, or relatively more often than other establishments such as bars. This profile data may then be compared with the candidate business locations to determine that a particular sighting for Angie (or for an anonymous individual with similar attributes to Angie's profile) is more likely to have occurred at a nearby coffee shop than a nearby bar.

At block 525, the location profile analytics system 100 determines, for each candidate business location, a probability that the sighting corresponds to the business location. The determination may be based at least in part on the distances determined at block 510, the business profiles (and related prior sightings) analyzed at block 515, and/or the consumer profiles (and related prior sightings) analyzed at block 520 as discussed above. The probability may be determined in any number of ways, with each of the three example variables described above receiving different weights depending upon the embodiment or based on the actual data involved. For example, distance may be given a higher relative weight if one candidate business location is in very close proximity (e.g., 50 feet) to a sighting and a second candidate business location is relatively farther away (e.g., 500 feet, relative to a sighting with a range of certainty of plus or minus 10 feet). Or, business profiles may be given a higher relative weight if a sighting occurred at a certain time (e.g. 7 am) at which only one or two candidate business locations are actually open for business (e.g., at 7 am the coffee shop is open, but the bar is closed). Or, consumer profiles may be given a higher relative weight if a sighting is associated with a segment of consumers who favor one business candidate location on the list (e.g. coffee shops, book stores), but few or none of the others (e.g., bars, night clubs).

At block 530, once a probability has been determined for each business location the location profile analytics system 100 selects a business location with the highest determined probability and/or assigns fractional shares of the sighting to the business locations in proportion to their calculated probabilities. The allocation of the sighting to business location(s) may then be provided or used by another process performed by the location profile analytics system 100, such as the process 300 of FIG. 3 (e.g., after block 325). In some embodiments the allocation of the sighting to business location(s) may be provided to a requesting entity or a third party for further analysis and data processing similar to the process 300 of FIG. 3.

Example System Implementation and Architecture

FIG. 6 is a block diagram of an example implementation of a location profile analytics system 100 in communication with a network 160 and various systems, such as mobile computing device(s) 162, mobile service provider systems(s) 164, business(es) 168, business location data source(s) 166A, consumer data source(s) 166B, and mobile sightings data source(s) 166C. The location profile analytics system 100 may be used to implement systems and methods described herein, including but not limited to the processes 300, 400, and 500 of FIGS. 3, 4, and 5, respectively.

The location profile analytics system 100 includes, for example, a personal computer that is IBM, Macintosh, or Linux/Unix compatible or a server or workstation. In one embodiment, the location profile analytics system 100 comprises a server, a laptop computer, a smart phone, a personal digital assistant, a kiosk, or an media player, for example. In one embodiment, the exemplary location profile analytics system 100 includes one or more central processing unit ("CPU") 105, which may each include a conventional or proprietary microprocessor. The location profile analytics system 100 further includes one or more memory 130, such as random access memory ("RAM") for temporary storage of information, one or more read only memory ("ROM") for permanent storage of information, and one or more mass storage device 120, such as a hard drive, diskette, solid state drive, or optical media storage device. Typically, the modules of the location profile analytics system 100 are connected to the computer using a standard based bus system 180. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of location profile analytics system 100 may be combined into fewer components and modules or further separated into additional components and modules.

The location profile analytics system 100 is generally controlled and coordinated by operating system software, such as Windows XP, Windows Vista, Windows 7, Windows 8, Windows Server, Unix, Linux, SunOS, Solaris, iOS, Blackberry OS, or other compatible operating systems. In Macintosh systems, the operating system may be any available operating system, such as MAC OS X. In other embodiments, the location profile analytics system 100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary location profile analytics system 100 may include one or more commonly available input/output (I/O) devices and interfaces 110, such as a keyboard, mouse, touchpad, and printer. In one embodiment, the I/O devices and interfaces 110 include one or more display devices, such as a monitor, that allows the visual presentation of data to a user. More particularly, a display device provides for the presentation of GUIs, application software data, and multimedia presentations, for example. The location profile analytics system 100 may also include one or more multimedia devices 140, such as speakers, video cards, graphics accelerators, and microphones, for example.

In the embodiment of FIG. 6, the I/O devices and interfaces 110 provide a communication interface to various external devices. In the embodiment of FIG. 6, the location profile analytics system 100 is electronically coupled to a network 160, which comprises one or more of a LAN, WAN, and/or the Internet, for example, via a wired, wireless, or combination of wired and wireless, communication link 115. The network 160 communicates with various computing devices and/or other electronic devices via wired or wireless communication links.

According to FIG. 6, in some embodiments information may be provided to the location profile analytics system 100 over the network 160 from one or more business location data sources 166A, consumer data source(s) 166B, and/or mobile sightings data source(s) 166C. The business location data source(s) 166A consumer data source(s) 166B, and/or mobile sightings data source(s) 166C may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

The business location data source(s) 166A may store, for example, attributes, profiles, and other data descriptive of or related to respective business locations. For example, attributes might include a name, a type of business (e.g., food, retail/shopping, service, etc.), hours of operation (e.g., hours during which the business location is open), geo-location information (including street addresses, latitude longitude coordinates, GPS coordinates, etc.), phone number(s), and any other information available for the business location. Business location profiles might include, for example, data describing consumer traffic patterns/trends for the business (e.g., which time(s) the business location appears to have a high (or low) level of traffic, which may be based in part on aggregated sightings data). Business location profiles might also include ratings and related consumer feedback data, which may be accessed or gathered from popular consumer ratings websites (such as Yelp.com or similar services).

The consumer data source(s) 166B may store, for example, credit bureau data (for example, credit bureau data from File Ones[SM]) and/or other consumer data. Consumer data source(s) 166B may also store geographic level demographics that include one or more models, such as models that identify lifestyle and/or socio-economic attributes associated with a geographic location (e.g., MOSAIC® segmentation and/or codes) and/or behavioral/attitudinal/psychographic attributes associated with a geographic location (e.g., TrueTouch[SM] Touch Points segmentation).

The mobile sightings data source(s) 166C may store, for example, data for one or more sightings for respective mobile devices. Each sighting may include a unique identifier the sighting, a unique identifier for a mobile computing device which generated the sighting, a unique and anonymous identifier for a consumer associated with the mobile computing device which generated the sighting, geo-location data for the sighting (e.g., latitude and longitude coordinates, GPS coordinates, etc.), a date and time for the sighting, and/or a range or other indication of the accuracy of the sighting.

In the embodiment of FIG. 6, the location profile analytics system 100 includes a location profile/sightings analysis engine 121, a consumer profile engine 122, and a user interface module 123 that may be stored in the mass storage device 120 as executable software codes that are executed by the CPU 105. These and other modules in the location profile analytics system 100 may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 6, the location profile analytics system 100 is configured to execute the location profile/sightings analysis engine 121, the consumer profile engine 122, and/or the user interface module 123 to perform the various methods and/or processes for mobile sightings data analysis as described herein (such as the processes described with respect to FIGS. 3, 4, and 5 herein).

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the location profile analytics system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Other Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
a non-transitory data store configured to store executable instructions; and
one or more computer processors configured to execute the executable instructions to:
receive an electronic message via a communication network, the electronic message comprising:
electronic location data identifying a location of a computing device of a user, wherein the location data identifies geographic coordinates and a range of accuracy for the geographic coordinates as determined by the computing device of the user, wherein the range of accuracy is represented by a radius identified in the location data, and
an identifier that identifies at least one of the user or the computing device of the user;
determine timing data indicating when the computing device was determined to be at the location, the timing data including at least one of a date or a time;
obtain entity information for a plurality of entities from an entity information data store based on the received electronic location data, the entity information including, for each of the plurality of entities, an entity name, an entity location, and times of operation for the entity indicating hours during which the entity is open for business at the entity location;
filter the plurality of entities based on the entity location for each of the plurality of entities and the radius identified in the location data representing the range of accuracy of the location data to generate a subset of entities located within the radius of the geographic coordinates;
obtain, from a profile data store, a user profile based on the received identifier;
determine, from the subset of entities and based on at least the timing data, the obtained user profile, and the times of operation for each entity of the subset of entities, which entity of the subset of entities the user likely visited at the at least one of the date or the time;
generate an electronic response to the electronic message based on the determined entity; and
transmit the electronic response to the user via the communication network, wherein the response causes presentation to the user, on a display screen of the computing device of the user, of information associated with the determined entity.

2. The system of claim 1, wherein the profile for the determined entity indicates one or more a volume or a relative likelihood of user visits by time of day and day of week and a relative likelihood of users having a specified user profile attribute.

3. The system of claim 1, wherein the user profile comprises at least attributes or categories that are indicative of a relative likelihood that the computing device of the user visits entities of a particular type at one or more of a particular time of day or day of week.

4. The system of claim 1, wherein the one or more computer processors are further configured to execute the executable instructions to generate a probability that the user likely visited the determined entity.

5. The system of claim 4, wherein the probability is generated based at least in part on the at least one of the date or the time.

6. The system of claim 1, wherein the one or more computer processors are further configured to execute the executable instructions to update one or more of the profile for the determined entity or the user profile.

7. The system of claim 1, wherein the filtering is further based on a traffic pattern or traffic trend associated with one or more of the plurality of entities.

8. A computer-implemented method comprising:
receiving, by a computing system having one or more hardware processors, an electronic message via a communication network, the electronic message comprising:
electronic location data identifying a location of a computing device of a user, wherein the location data identifies geographic coordinates and a range of accuracy for the geographic coordinates as determined by the computing device of the user, wherein the range of accuracy is represented by a radius identified in the location data, and
an identifier that identifies at least one of the user or the computing device of the user;
determining, by the computing system, timing data indicating when the computing device was determined to be at the location, the timing data including at least one of a date or a time;
obtaining, by the computing system, entity information for a plurality of entities from an entity information data store based on the received electronic location data, the entity information including, for each of the plurality of entities, an entity name, an entity location, and times of operation for the entity indicating hours during which the entity is open for business at the entity location;
filtering, by the computing system, the plurality of entities based on the entity location for each of the plurality of entities and the radius identified in the location data representing the range of accuracy of the location data to generate a subset of entities located within the radius of the geographic coordinates;
obtaining, by the computing system from a profile data store, a user profile based on the received identifier;
determining, by the computing system from the subset of entities and based on at least the timing data, the obtained user profile, and the times of operation for each entity of the subset of entities, which entity of the subset of entities the user likely visited at the at least one of the date or the time;
generating an electronic response to the electronic message based on the determined entity; and
transmitting the electronic response to the user via the communication network, wherein the response causes presentation to the user, on a display screen of the computing device of the user, of information associated with the determined entity.

9. The method of claim 8, wherein the profile for the determined entity indicates one or more a volume or a relative likelihood of user visits by time of day and day of week.

10. The method of claim 8, wherein the user profile comprises at least attributes or categories that are indicative of a relative likelihood that the computing device of the user visits entities of a particular type at one or more of a particular time of day or day of week.

11. The method of claim 10, further comprising generating a probability that the user likely visited the determined entity.

12. The method of claim 11, wherein the probability is generated based at least in part on the at least one of the date or the time.

13. The method of claim 8, wherein the filtering is further based on a traffic pattern or traffic trend associated with one or more of the plurality of entities.

14. The method of claim 8 further comprising generating an entity profile for a business based on location data associated with each of a plurality of user devices.

* * * * *